US010047724B2

(12) United States Patent
Kisovec

(10) Patent No.: US 10,047,724 B2
(45) Date of Patent: Aug. 14, 2018

(54) WIND TURBINE SYSTEM

(71) Applicant: EQUIPEMENTS WIND WILL INC., Saint-Hubert (CA)

(72) Inventor: Jean-Francis Kisovec, Saint-Hubert (CA)

(*) Notice: Subject to any disclaimer, the term of this patent is extended or adjusted under 35 U.S.C. 154(b) by 0 days.

(21) Appl. No.: 14/763,396

(22) PCT Filed: Jan. 27, 2014

(86) PCT No.: PCT/CA2014/000081
§ 371 (c)(1),
(2) Date: Jul. 24, 2015

(87) PCT Pub. No.: WO2014/113885
PCT Pub. Date: Jul. 31, 2014

(65) Prior Publication Data
US 2015/0369216 A1 Dec. 24, 2015

Related U.S. Application Data

(60) Provisional application No. 61/757,107, filed on Jan. 26, 2013.

(51) Int. Cl.
*F03D 3/06* (2006.01)
*F03D 7/06* (2006.01)
(Continued)

(52) U.S. Cl.
CPC ............ *F03D 9/003* (2013.01); *F03D 3/068* (2013.01); *F03D 7/06* (2013.01); *F03D 9/25* (2016.05);
(Continued)

(58) Field of Classification Search
CPC .................................................... F03D 3/005
(Continued)

(56) References Cited

U.S. PATENT DOCUMENTS

| 7,109,599 B2 * | 9/2006 | Watkins ............... F03D 3/005 290/55 |
| 2007/0024144 A1 * | 2/2007 | Obidniak ............... H02K 21/24 310/156.36 |

(Continued)

FOREIGN PATENT DOCUMENTS

| CH | 665303 | 4/1988 |
| CN | 102011701 | 4/2011 |

(Continued)

*Primary Examiner* — Tulsidas C Patel
*Assistant Examiner* — Charles Reid, Jr.
(74) *Attorney, Agent, or Firm* — Norton Rose Fulbright Canada LLP

(57) ABSTRACT

A wind turbine system includes a current generator having a planar base member, a connection member secured at a geometrical center of the base member and configured to rotate about an axis transverse to a plane of the support member upon exertion of wind pressure on the wind turbine, a rotor assembly secured to the connection member for rotation about the axis, the rotor assembly spaced from the base member and including planar rotor members spaced from and parallel to one another; and a planar stator assembly secured to the base member and centered in a spacing between the rotor members, the stator assembly configured to generate a current upon rotation of the rotor assembly relative thereto. A control system supplies power from the generator to an electrical grid. A control system adjusts an angular position of the turbine blades. A wind sensor measures a differential wind pressure.

5 Claims, 16 Drawing Sheets

(51) Int. Cl.
*F03D 9/25* (2016.01)
*H02K 3/26* (2006.01)
*H02K 1/18* (2006.01)
*H02K 1/27* (2006.01)
*H02K 7/18* (2006.01)
*H02K 21/24* (2006.01)
*G01P 5/14* (2006.01)
*F03D 9/00* (2016.01)

(52) U.S. Cl.
CPC ............... *G01P 5/14* (2013.01); *H02K 1/182* (2013.01); *H02K 1/2793* (2013.01); *H02K 3/26* (2013.01); *H02K 7/183* (2013.01); *H02K 21/24* (2013.01); *F05B 2260/76* (2013.01); *F05B 2260/902* (2013.01); *H02K 2211/03* (2013.01); *H02K 2213/09* (2013.01); *Y02E 10/74* (2013.01)

(58) Field of Classification Search
USPC .......................................................... 290/55
See application file for complete search history.

(56) References Cited

U.S. PATENT DOCUMENTS

| | | | |
|---|---|---|---|
| 2010/0001610 A1* | 1/2010 | Iki | H02K 3/26 310/208 |
| 2010/0096854 A1* | 4/2010 | Paluszek | F03D 3/067 290/44 |
| 2011/0123332 A1 | 5/2011 | Grenier et al. | |
| 2011/0133589 A1* | 6/2011 | Bi | H02K 1/141 310/156.01 |
| 2013/0307366 A1* | 11/2013 | Naginsky | H02K 3/26 310/180 |

FOREIGN PATENT DOCUMENTS

| | | |
|---|---|---|
| EP | 1149241 | 10/2001 |
| GB | 2485185 | 5/2012 |
| WO | 2005/019642 | 3/2005 |
| WO | 2009/024960 | 2/2009 |
| WO | 2010/019951 | 2/2010 |

\* cited by examiner

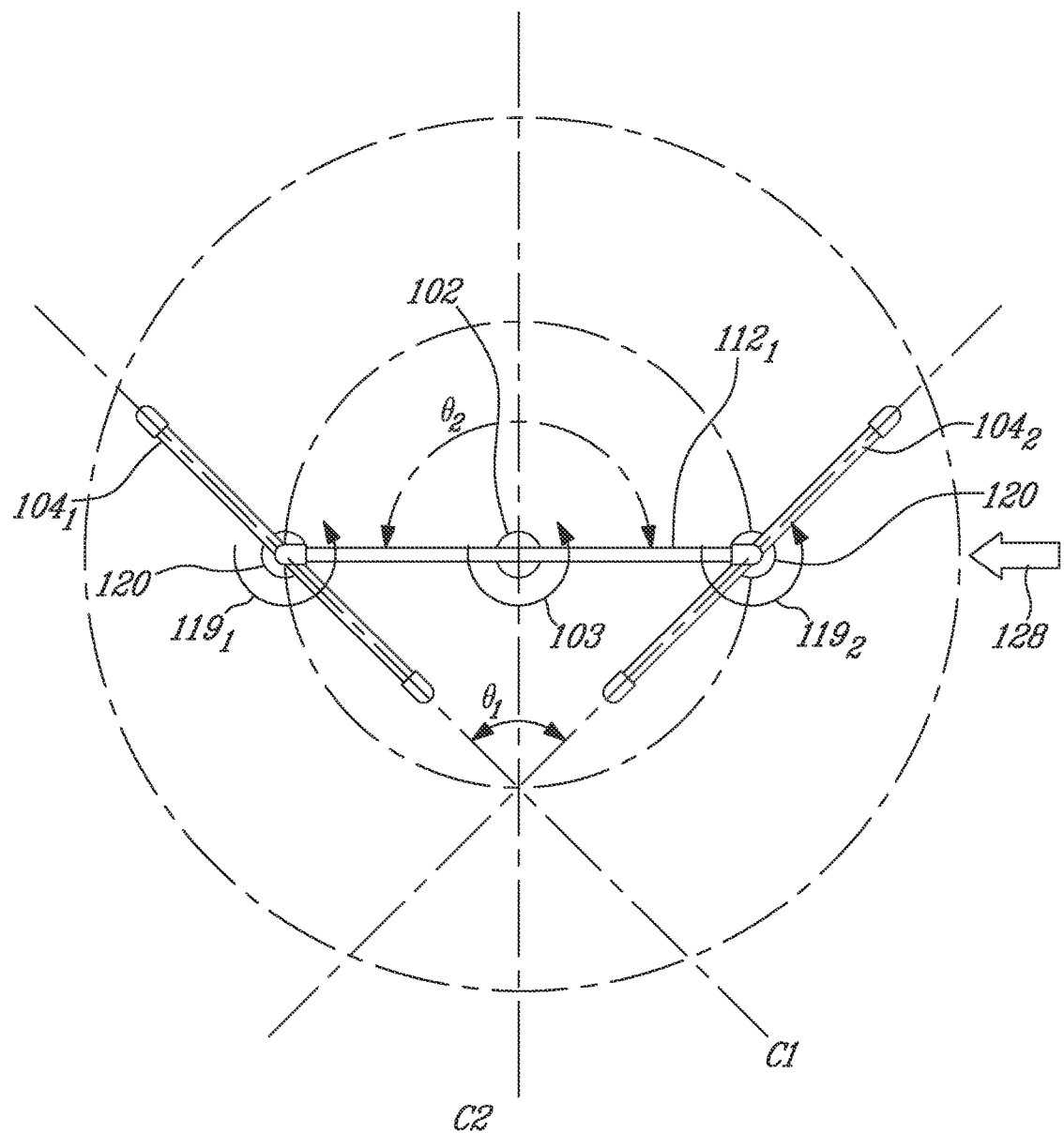
Fig_1B

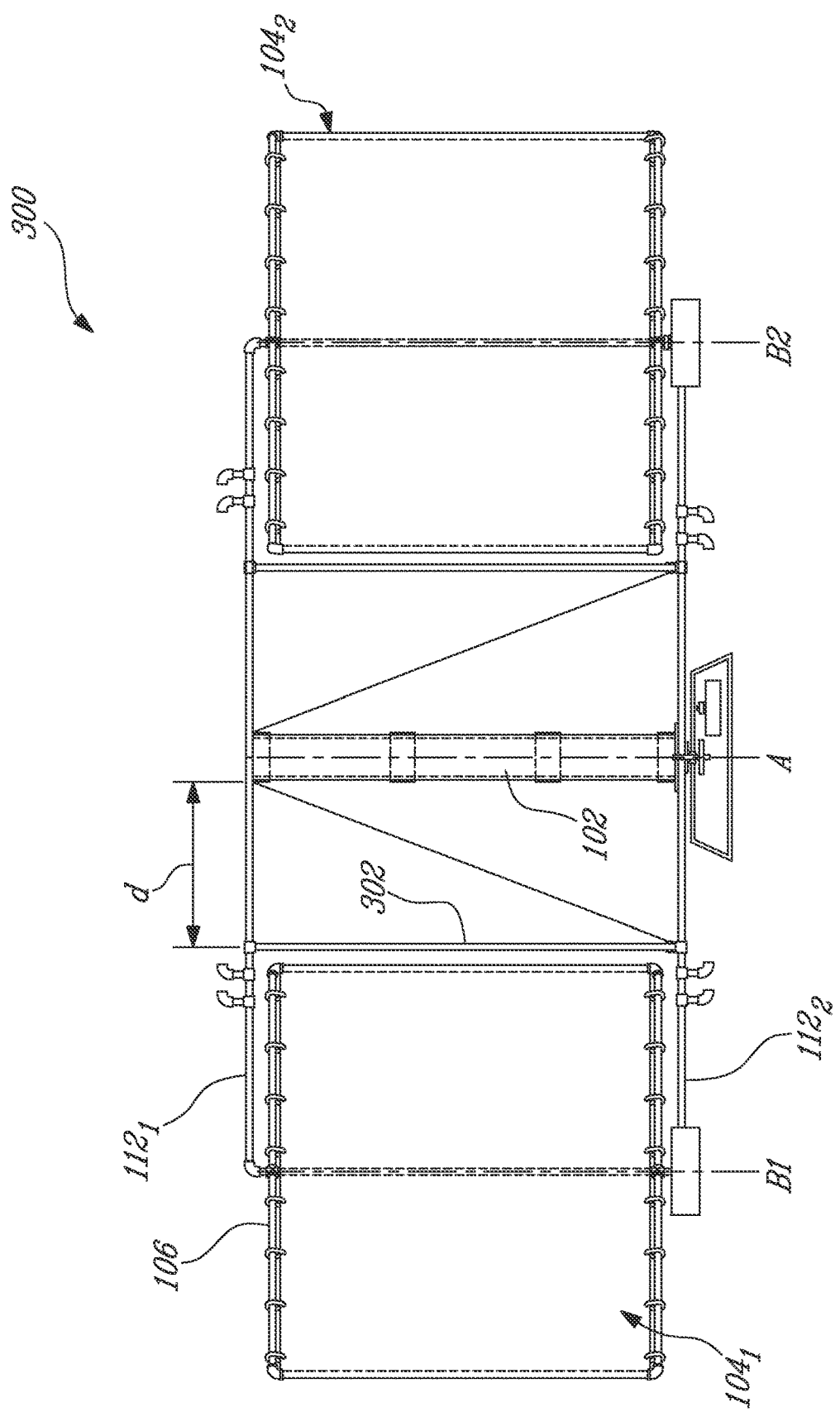

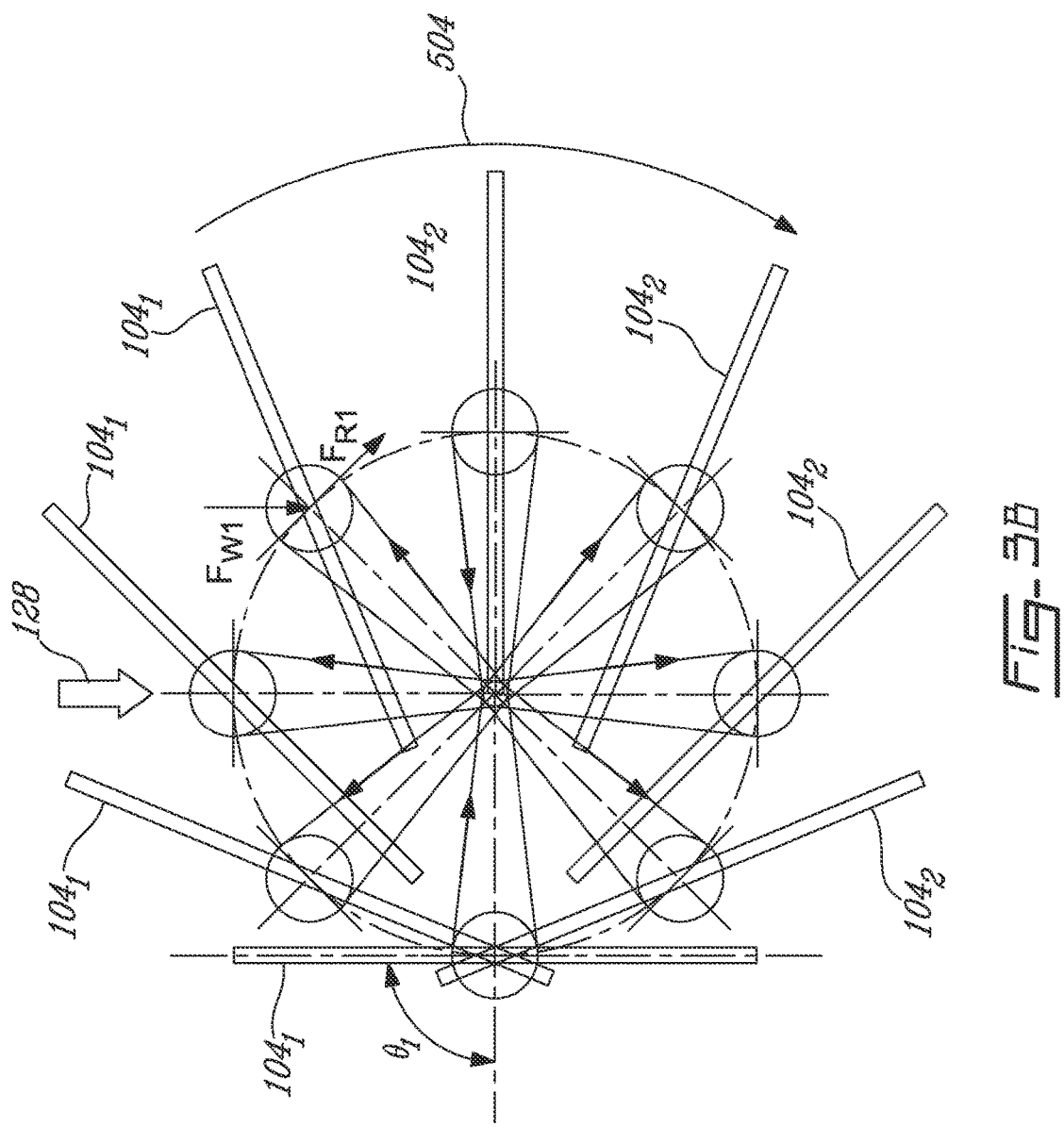

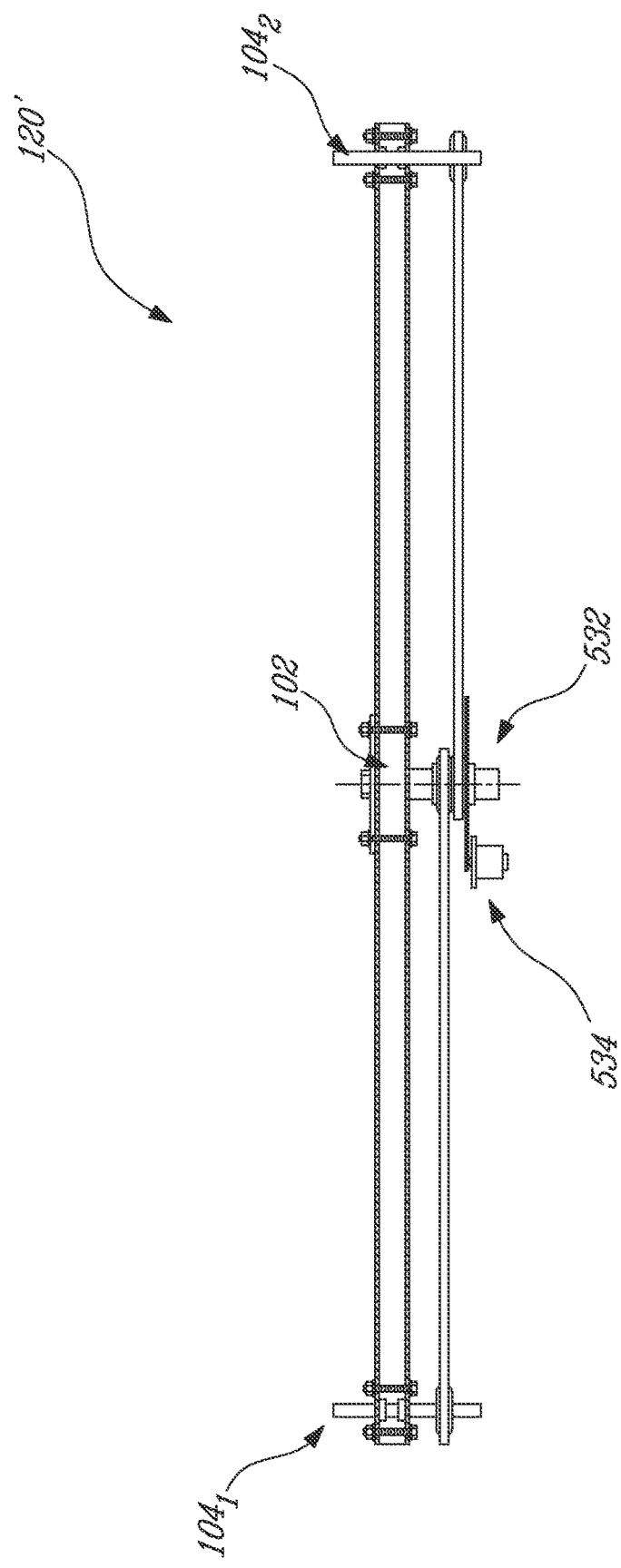

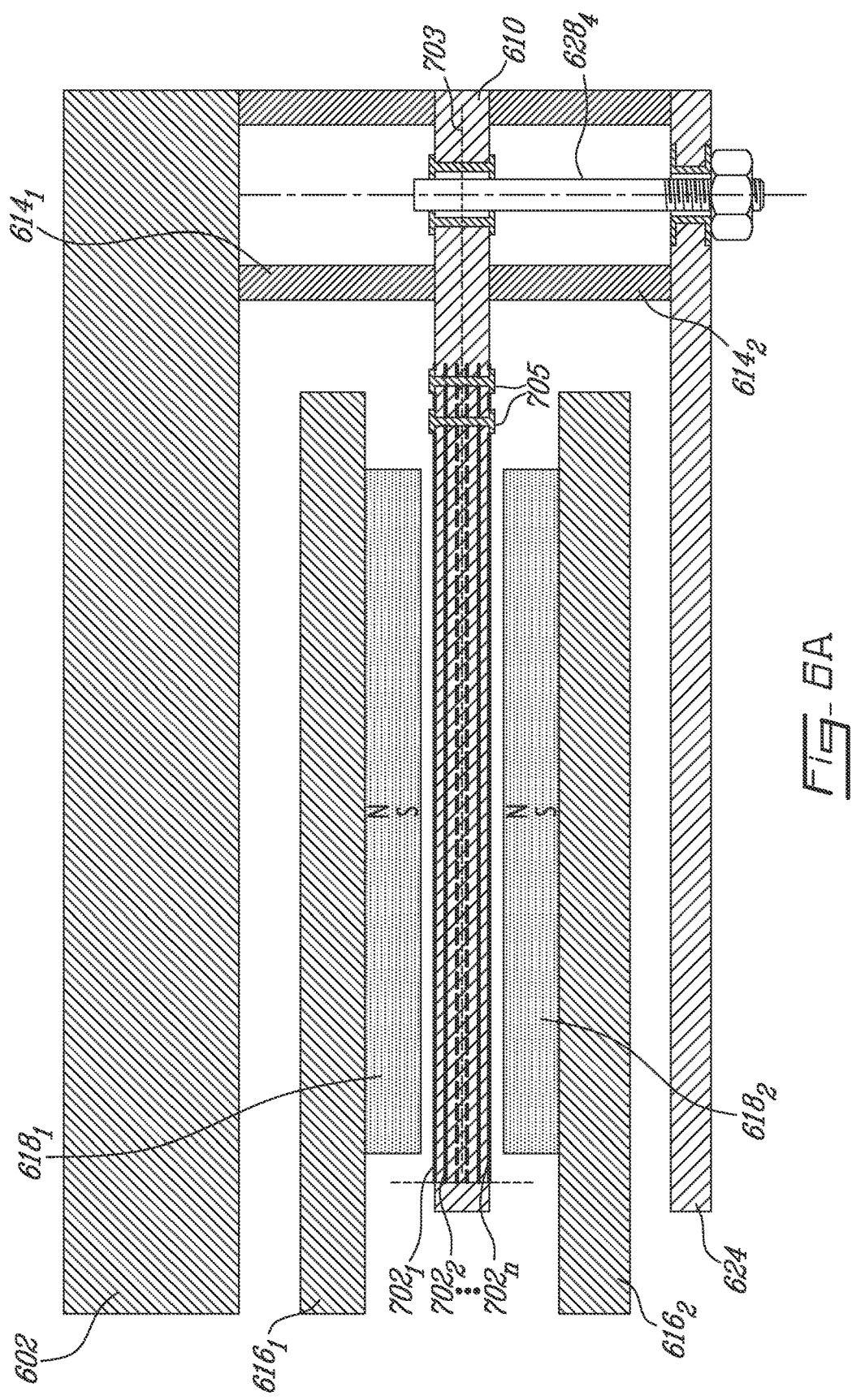
Fig_6A

WIND TURBINE SYSTEM

CROSS REFERENCE TO RELATED APPLICATIONS

The present patent application is a US National Stage of International Application No. PCT/CA2014/000081, filed on Jan. 27, 2014, which claims priority of U.S. provisional Application Ser. No. 61/757,107, filed on Jan. 26, 2013.

TECHNICAL FIELD

The present invention relates to the field of wind turbine systems.

BACKGROUND OF THE ART

Wind turbine systems are used to convert wind energy into electrical power. However, such systems are typically complex and bulky, lack reliability and efficiency, in addition to not being profitable in the long run. It may also be difficult to extract, distribute, and account for the generated electrical power.

There is therefore a need for an improved wind turbine system.

SUMMARY

In accordance with a first broad aspect, there is provided a current generator for a wind turbine, the generator comprising a substantially planar base member; a connection member secured to the base member at a geometrical center thereof, the connection member configured to rotate about an axis transverse to a plane of the support member upon exertion of wind pressure on the wind turbine; a rotor assembly secured to the connection member for rotation about the axis, the rotor assembly spaced apart from the base member and comprising a first substantially planar rotor member and a second substantially planar rotor member, the first rotor member spaced from the second rotor member and substantially parallel thereto; and a substantially planar stator assembly secured to the base member and centered in a spacing between the first rotor member and the second rotor member, the stator assembly configured to generate a current upon rotation of the rotor assembly relative thereto.

In some embodiments, the base member, the first rotor member, the second rotor member, and the stator assembly are circular and concentric about the geometrical center.

In some embodiments, the stator assembly comprises a printed circuit board having a plurality of spaced layers, each one of the plurality of layers comprising a plurality of windings arranged in an array, each one of the plurality of windings adapted to generate the current upon rotation of the first and second rotor members relative to the stator assembly.

In some embodiments, each one of the plurality of windings comprises an electrical conductor wound around a plurality of concentric turns so as to form a trapezoidal shape and further wherein the rotor assembly comprises a first plurality of equidistantly spaced magnets arranged in a first circumferential array at a lower surface of the first rotor member and a second plurality of equidistantly spaced magnets arranged in a second circumferential array at an upper face of the second rotor member, the first plurality of magnets aligned with the second plurality of magnets along a direction parallel to the axis, the current generated upon passage of the first and second plurality of magnets adjacent the plurality of windings.

In some embodiments, a first spacing between the first plurality of magnets is equal to a second spacing between the second plurality of magnets, a first width of the first plurality of magnets is equal to a second width of the second plurality of magnets, and the first spacing is equal to the first width and to a third width of an inner loop of each one of the plurality of windings at a small base of the trapezoidal shape.

In some embodiments, the first plurality of magnets and the second plurality of magnets have alternating polarity and further wherein adjacent ones of the first plurality of magnets and of the second plurality of magnets have alternating polarity.

In accordance with a second broad aspect, there is provided a control system for adjusting an angular position of a blade of a wind turbine, the blade having a central axis and configured to rotate thereabout, the control system comprising a connection member rotationally connected to the blade and adapted to rotate therewith; a disc attached to the connection member and adapted to rotate therewith upon rotation of the blade about the central axis, a brake assembly configured to selectively brake or activate rotation of the disc; a processing unit connected to the brake assembly and configured to receive input data from at least one position sensor and at least one wind sensor connected to the blade, the input data indicative of the angular position of the blade and of a direction of wind applied on the blade, to determine on the basis of the input data whether to adjust the angular position of the blade, and, if the angular position of the blade is to be adjusted, to output a control signal to the the brake assembly for causing the latter to selectively brake or activate rotation of the disc for adjusting the angular position of the blade.

In some embodiments, the disc is made of a magnetic permeable material and has formed at a perimeter thereof a plurality of equally spaced slots and further wherein the brake assembly comprises a plurality of magnets positioned adjacent the perimeter of the disc, each one of the plurality of magnets having an opening adapted to receive therein at least a portion of a selected one of the plurality of slots, and an induction coil for each one of the plurality of magnets, the induction coil configured to induce a magnetic field in the magnet in response to being energized with an electrical pulse.

In some embodiments, the processing unit is adapted to output the control signal to the brake assembly for causing the magnetic field to be induced in a sequence in the plurality of magnets.

In some embodiments, the brake assembly comprises a plurality of position detectors positioned adjacent the perimeter of the disc, each one of the plurality of position detectors adapted to detect a passage of any one of the plurality of slots and accordingly determine a position thereof relative to the plurality of magnets, and to output to the processing unit position data indicative of the determined position.

In some embodiments, the processing unit is configured to identify, on the basis of the position data, a given one of the plurality of slots that is entirely received within an opening of a given one of the plurality of magnets, and to output the control signal to the brake assembly for causing energization of the induction coil for the given one of the plurality of magnets, thereby holding the identified slot in place within the opening and slowing down rotation of the disc.

In some embodiments, the processing unit is configured to identify, on the basis of the position data, a given one of the plurality of slots that has reached a desired position relative to the plurality of magnets and to output the control signal to the brake assembly for causing de-energization of the induction coil for the given one of the plurality of magnets and causing energization of the induction coil for a given one of the plurality of magnets that is next in the sequence.

In some embodiments, the brake assembly is configured to activate rotation of the disc in one of a clockwise and a counterclockwise direction and further wherein the processing unit is adapted to determine, on the basis of the position data, the portion of the plurality of slots retained in the opening of the plurality of magnets and the one of the clockwise and the counterclockwise direction to be activated, if the clockwise rotation is to be activated, to output the control signal to the brake assembly to first cause energization of the induction coil for a first one of the plurality of magnets whose opening has retained therein a left half of a first slot, thereby causing the first magnet to attract the first slot further towards the left and activating the clockwise direction, if the clockwise rotation is to be activated, and if the counterclockwise rotation is to be activated, to output the control signal to the brake assembly to first cause energization of the induction coil for a second one of the plurality of magnets whose opening has retained therein a right half of a second slot, thereby causing the second magnet to attract the second slot further towards the right and activating the counterclockwise direction.

In some embodiments, the brake assembly comprises a contact member configured to apply pressure on the disc for slowing down rotation thereof.

In accordance with a third broad aspect, there is provided a control system for a wind turbine generator, the wind turbine generator comprising a rotor and stator assembly configured to cooperate to produce electrical power, the control system comprising a power buffer unit adapted to receive the electrical power produced by the wind turbine generator and to store the received electrical power; and a processing unit connected to the power buffer unit and configured to intermittently supply the stored electrical power to an electrical grid via at least one of a plurality of output lines.

In some embodiments, the control system further comprises a printed circuit board positioned adjacent the rotor and stator assembly, the printed circuit board having mounted thereon the power buffer unit and the processing unit.

In some embodiments, the processing unit is adapted to monitor the electrical grid for determining suitable times at which to supply the stored electrical power to the electrical grid.

In some embodiments, the processing unit is adapted to intermittently capture images of a cycle of the electrical grid, compare a previous one of the capture images to a present one of the captured images, and determine that it is suitable to supply the stored electrical power to the electrical grid if the previous image matches the present image.

In some embodiments, the control system further comprises a plurality of switches connected to the power buffer unit and to the plurality of output lines, each one of the plurality of switches moveable between a first position where the stored power flows to a corresponding one of the plurality of output lines and a second position where no power flows to the corresponding output line.

In some embodiments, the power buffer comprises a multi-stage booster configured to raise a voltage level of the received power to a predetermined voltage level.

In some embodiments, the controller is adapted to be powered from one of battery power and the received electric power.

In some embodiments, the controller comprises a communication unit configured to communicate with the electrical grid for determining properties thereof and further wherein, if the properties meet predetermined criteria, to authorize connection of the power buffer unit to the electrical grid for supplying the stored electrical power thereto.

In some embodiments, the processing unit is configured to detect an abnormality of the electrical grid and to cause a disconnection from the electrical grid accordingly.

In some embodiments, the control system comprises a turbine control module adapted to receive sensor data from at least one position sensor secured to at least one component of the wind turbine and configured to measure a position of the at least one component, and to output on the basis of the sensor data a control signal for causing an adjustment of an angular position of the at least one component.

In some embodiments, the memory has stored therein predetermined sensor data having associated therewith wind direction and wind speed values and wherein the controller comprises a turbine control module adapted to receive sensor data from at least one sensor, compare the received sensor data to the predetermined sensor data, and determine on the basis of the comparison the wind direction and wind speed values corresponding to the received sensor data.

In some embodiments, the turbine control module is adapted to compare the wind direction and wind speed values to at least one threshold and, if the wind direction and wind speed values exceed the at least one threshold, output a control signal to cause an adjustment of a positioning of blades of the wind turbine for reducing an effectiveness of the blades to capture wind energy.

In accordance with a fourth broad aspect, there is provided a wind sensor module comprising a printed circuit board; a plurality of pressure sensors mounted on the printed circuit board along a plane thereof, each one of the plurality of pressure sensors configured to measure a differential pressure between atmospheric pressure and a dynamic pressure of wind applied on the wind sensor module; and a communication link for outputting the measured differential pressure.

In some embodiments, the plurality of pressure sensors are each configured to measure the differential pressure at a predetermined time interval.

In some embodiments, the plurality of pressure sensors comprises three pressure sensors positioned along a plane substantially parallel to a plane of the printed circuit board, the plurality of pressure symmetrically positioned about a geometric center of the printed circuit board.

In some embodiments, the printed circuit board is a rectangle and wherein the plurality of pressure sensors comprises four pressure sensors positioned at opposite sides of the printed circuit board, a first one and a second one of the sensors positioned along a first axis, a third one and a fourth one of the pressure sensors positioned along a second axis, the first axis and the second axis crossing at a geometric center of the printed circuit board.

In some embodiments, each one of the four pressure sensors has an air intake extending away from the printed circuit board along a plane substantially parallel to a plane of the printed circuit board.

In some embodiments, the plurality of pressure sensors comprises a fifth pressure sensor positioned at a geometric center of the printed circuit board, the fifth pressure center having an air intake that extends away from the printed circuit board along a third axis transverse to the plane of the printed circuit board.

BRIEF DESCRIPTION OF THE DRAWINGS

Further features and advantages of the present invention will become apparent from the following detailed description, taken in combination with the appended drawings, in which:

FIG. 1B is a top view of the wind turbine of FIG. 1A with arms separated by 180 degrees;

FIG. 2B is a front schematic diagram of a wind turbine, in accordance with another illustrative embodiment;

FIG. 3B is a schematic diagram showing rotation of one blade relative to another blade over time, in accordance with an illustrative embodiment;

FIG. 4C is a schematic diagram of a blade angular position control system, in accordance with another illustrative embodiment;

FIG. 6A is a schematic diagram of the rotor and stator of the generator of FIG. 5A;

It will be noted that throughout the appended drawings, like features are identified by like reference numerals.

DETAILED DESCRIPTION

Figure 1A:
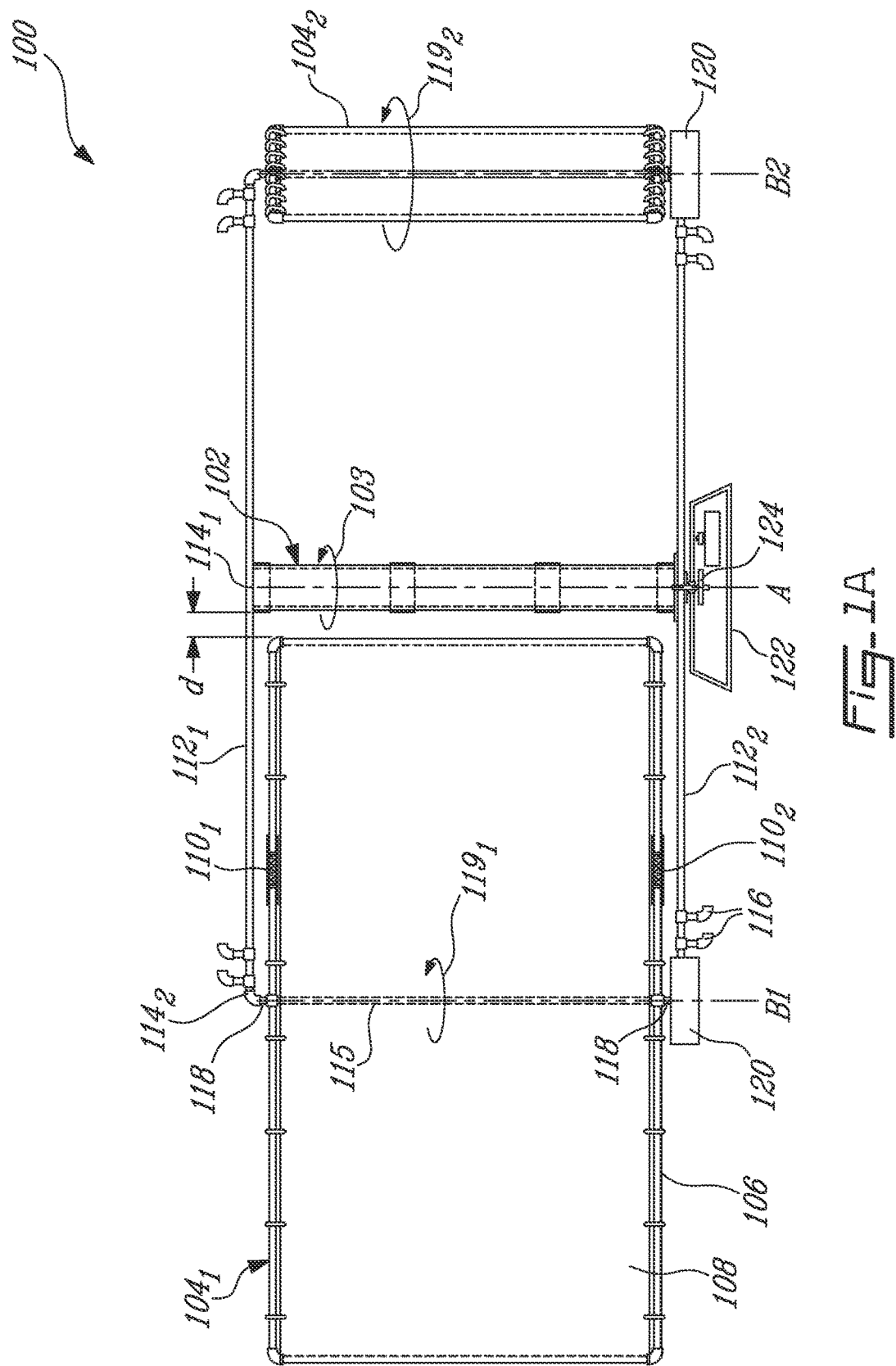
FIG. 1A is a front schematic diagram of a wind turbine system with two blades, in accordance with an illustrative embodiment.

FIG. 1A illustrates an exemplary wind turbine system 100. The wind turbine system 100 is illustratively a vertical-axis wind turbine, that comprises a central pole 102, which has a longitudinal axis A and is adapted to rotate thereabout in the direction of arrow 103. Although the central pole 102 is illustrated as rotating in a counter-clockwise direction 103, it should be understood that bi-directional rotation of the central pole 102 may apply and that the central pole 102 may therefore also rotate in a clockwise direction. The wind turbine system 100 further comprises a plurality (two (2) in the illustrated embodiment) of blades as in $104_1$, $104_2$, each blade $104_1$ or $104_2$ comprising a frame 106 that supports a surface 108. The dimensions of the frame 106 are illustratively selected in accordance to the level of electrical power that is to be generated by the wind turbine system 100 at a given wind speed. In one embodiment, if it is desired to convert kinetic energy from wind having a reference speed of 11 m/s into 4 kW electrical power, a suitable width and length for the frame 106 may then be about seven (7) feet four (4) inches and six (6) feet six (6) inches, respectively. Although the frame 106 is illustrated as rectangular, it should be understood that any other suitable shape may apply.

Although the surface 108 may be made of any suitable material, it is desirable for the overall structure to be lightweight and flexible. It is also desirable to use materials that ensure that the wind turbine system 100 remains quiet when rotating and is not subject to vibration. As such, PVC canvas may be used as a material for the surface 108 and aluminum for the frame 106. Other materials may apply. When mounted to the frame 106 during assembly of the wind turbine system 100, the surface 108 is illustratively stretched on the frame 106 so as to be flat. For this purpose, stretchers as in $110_1$, $110_2$ may be provided in the frame 106 and used for stretching the surface 108 supported on the frame 106.

During assembly of the wind turbine system 100, each blade $104_1$, $104_2$ is secured to the central pole 102 via a pair of attachment members or arms $112_1$, $112_2$ that are connected to the central pole 102 and extend away therefrom in a direction (not shown) substantially perpendicular to the longitudinal axis A. The arms $112_1$, $112_2$ may therefore rotate along with the central pole 102 upon rotation of the latter. The number of arm pairs $112_1$, $112_2$ (and accordingly the number of blades $104_1$, $104_2$) attached to the central pole 102, the alignment angles between pairs of the arms $112_1$, $112_2$, the properties of the surface 108, and the geometry of the frames 106 (e.g. square, rectangular, or the like) are illustratively defined in accordance to a variety of criteria. These criteria include, but are not limited to, the desired average power of the wind turbine 100, the average wind conditions where the system 100 is installed, and particular characteristics of installation of the wind turbine 100 (e.g. on a silo, a flat roof, etc.).

Each arm $112_1$ or $112_2$ comprises a first end $114_1$ and a second end $114_2$ opposite to the first end $114_1$. For each arm $112_1$ or $112_2$, the first end $114_1$ is secured to the central pole 102 while the second end $114_2$ is secured to the frame 106 such that both arms $112_1$, $112_2$ are positioned at opposite ends of the central pole 102 and of the frame 106. In particular, the first end $114_1$ of the arm $112_1$ is illustratively secured to a first end (not shown) of the central pole 102 while the first end $114_1$ of the arm $112_2$ is secured to a second end (not shown) of the central pole 102, the second central pole end opposite to the first central pole end. The second end $114_2$ of the arm $112_1$ is then secured to a first edge (not shown) of the frame 106 while the second end $114_2$ of the arm $112_2$ is secured to a second edge (not shown) of the frame 106, the second frame edge opposite to the first frame edge. More particularly, the second ends $114_2$ of the arms $112_1$, $112_2$ are each secured to a geometric center (not shown) of the corresponding frame side. The arms $112_1$, $112_2$ are therefore symmetrically positioned relative to the central pole 102 and the frame 106. Each frame 106 may also comprise an elongate support member 115, such as a bar or the like, that connects the geometric centers of both arms $112_1$, $112_2$, thereby providing reinforcement for the frame 106. Attachment members as in 116, such as ties, may further be provided in the arm $112_2$ of each frame 106, each attachment member 116 configured to secure the arm $112_2$ to a structure (not shown), thereby further reinforcement for the wind turbine system 100.

A rotary connection 118, such as a ball bearing, illustratively connects the end $114_2$ of each arm $112_1$, $112_2$ to the frame 106 (and more particularly to the geometric center thereof) of a corresponding blade $104_1$ or $104_2$. Provision of the ball bearings as in 118 allows rotation of each blade $104_1$, $104_2$ about axes B1 and B2, respectively, the axes B1 and B2 being substantially parallel to axis A. In particular, blade $104_1$ rotates in the direction of arrow $119_1$ about axis B1 while blade $104_2$ rotates in the direction of arrow $119_2$ about axis B2. Although rotation of the blades $104_1$, $104_2$ is illustrated as being counter-clockwise, it should be understood that the rotation may also be clockwise and that rotation of the blades $104_1$, $104_2$ may therefore be bi-directional. The blades $104_1$, $104_2$ are further each illustratively spaced from the pair of arms $112_1$, $112_2$ so as to be able to freely rotate therebetween. Thus, the height of the frame 106 is set so as to be smaller than the height of the central pole 102. The blades $104_1$, $104_2$ are further each illustratively spaced from an outer surface (not shown) of the central pole 102 by a distance d, thereby further enabling free rotation of the blades $104_1$, $104_2$. Although the distance d may be varied as desired, it is desirable for the distance d to be as small as possible in order to reduce the overall size of the wind turbine system 100.

As will be discussed further below, the wind turbine system 100 may comprise one or more controllers as in 120 adapted to control an angular orientation or position of the blades $104_1$, $104_2$. Each controller 120 is illustratively mounted to an arm $112_2$ of a corresponding blade $104_1$ or $104_2$ whose angular position the controller 120 controls and positioned adjacent the geometric center of the frame 106. Each controller 120 may then comprise a brake assembly (not shown) that is used to control the angular orientation of the corresponding blade $104_1$ or $104_2$ so as to keep the blade $104_1$ or $104_2$ at an optimal angle, which ensures that the maximum amount of wind energy is captured upon wind pressure being applied to the blade $104_1$ or $104_2$.

The wind turbine system 100 may further comprise a base 122 that is secured to the central pole 102 using suitable attachment means (not shown), such as screws, bolts, or the like. The base 122 has mounted thereon a generator 124 (and associated controller, not shown) that produces electrical power (e.g. a current) upon rotation of the central pole 102 in response to application of wind pressure to wind turbine system 100. Although the controllers 120 are illustrated as being distant from the generator controller, it should be understood that all turbine controllers may be provided on the base 122 and may also be integrated as a single unit. In such a case and as will be discussed further below, a single controller 120 may be used to control the angular orientation of all blades as in $104_1$ and $104_2$. When more than one controller as in 120 is used, all controllers 120 are synchronized to achieve accurate positioning of all blades as in $104_1$, $104_2$.

In operation, wind pressure causes rotation of the turbine components, e.g. of the central pole 102, the arms $112_1$, $112_2$, and the blades $104_1$, $104_2$. In one embodiment, the rotation speed of the wind turbine system 100 is low (approximately one (1) or two (2) rotations per second). As will be discussed further below, during rotation of the central pole 102 and the attached pairs of arms $112_1$, $112_2$, the current wind direction and relative angular position of each blade frame 106 is determined and a correction of the angular position of each frame 106 computed accordingly. The angular correction is illustratively computed at predetermined time intervals, which depend on the response time of one or more wind sensor(s) (not shown) configured to measure the direction of the wind. In one embodiment, the angular correction is computed fifty (50) times per second. In another embodiment, the angular correction is computed one hundred (100) times per second. It should be understood that other time intervals may apply.

The angular correction may be computed at the controller 120 or at the controller provided at the generator 124 such that a force that applies on the blade as in 1041, 1042 as a result of exertion of wind remains tangent to the rotation and is therefore optimal. As known to those skilled in the art, the angular correction may be computed with the Chasles relation applied to force vectors using predetermined tables. The computed angular correction may then be used to correct, if necessary, the angular orientation of the frames 106 in accordance with the wind direction. In particular, the angular position (i.e. angle of incidence with the wind) of the turbine's blades 1041, 1042 may be adjusted so as to maximize the effectiveness of the frames 106 to capture wind energy. For this purpose, upon computation of the angular correction, the brake assembly of the controller 120 may be controlled to either brake, allow free rotation of, and/or invert a rotation of a given blade 1041, 1042. The brake assembly is illustratively controlled to ensure that the correction is applied in a synchronized manner for all blades as in 1041, 1042.

Referring to FIG. 1B, for a wind turbine system as in 100 with two blades, the blades $104_1$, $104_2$ are illustratively positioned (and the angular correction applied, if necessary) such that, at any given time, the angles between a longitudinal axis C1 of each blade and a reference axis C2 is complementary. In this manner, the angle $\theta_1$ between the longitudinal axes C1 of both blades may be set to is substantially equal to substantially ninety (90) degrees (+/−a predetermined tolerance, e.g. five (5) degrees). In addition, upon application of wind 128 on the wind turbine system 100, the arms $112_1$, $112_2$, connected to each blade $104_1$, $104_2$ are displaced relative to one another. This causes a change in an alignment angle $\theta_2$ between the arms $112_1$, $112_2$ connected to the frame 106 of the first blade $104_1$ and the arms $112_1$, $112_2$ connected to the frame 106 of the second blade $104_2$. Indeed, in FIG. 1B, the angle $\theta_2$ between the arms $112_1$ of the blades $104_1$, $104_2$ (which is the same as the angle between the arms $112_2$ due to the configuration of the frames 106) is substantially equal to 180 degrees.

Figure 2A:
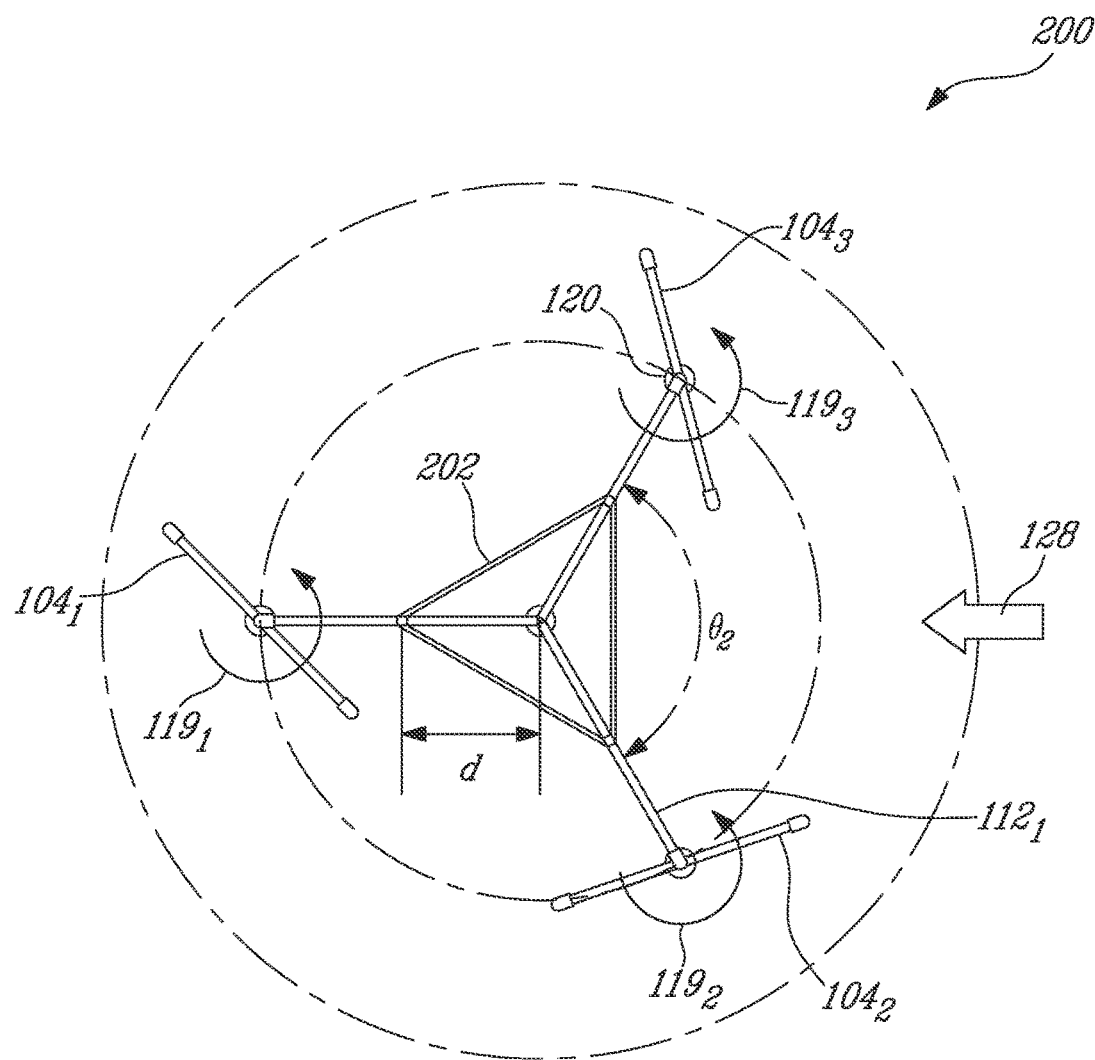
FIG. 2A is a top schematic diagram of a wind turbine with three blades, in accordance with an illustrative embodiment.

It should be understood that the wind turbine system 100 may comprise more than two (2) blades as in $104_1$, $104_2$ and that the number of blades may be adjusted as desired. FIG. 2A shows an embodiment of a wind turbine 200 comprising three (3) blades as in $104_1$, $104_2$, $104_3$. In this embodiment, the blades $104_2$, $104_2$, $104_3$ are positioned symmetrically about the central pole (reference 102 in FIG. 1A) such that the alignment angle $\theta_2$ between two adjacent ones of the blades $104_2$, $104_2$, $104_3$ is substantially equal to a predetermined value (e.g. 120 degrees). The alignment angle $\theta_2$ shown in FIG. 2A therefore remains the same between all arm pairs, i.e. the angle between the arms (reference $112_1$, $112_2$ in FIG. 1A) connected to the first blade $104_1$ and the arms $112_1$, $112_2$ connected to the second blade $104_2$, the angle between the arms $112_1$, $112_2$ connected to the first blade $104_1$ and the arms $112_1$, $112_2$ connected to the third blade $104_3$, and the angle between the arms $112_1$, $112_2$ connected to the third blade $104_3$ and the arms $112_1$, $112_2$ connected to the second blade $104_2$ are all equal to 120 degrees. In one embodiment, in order to maintain the alignment angle to the predetermined value, a reinforcement bar 202 is illustratively provided between each arm pair. It should be understood that other configurations may apply.

Figure 2C:
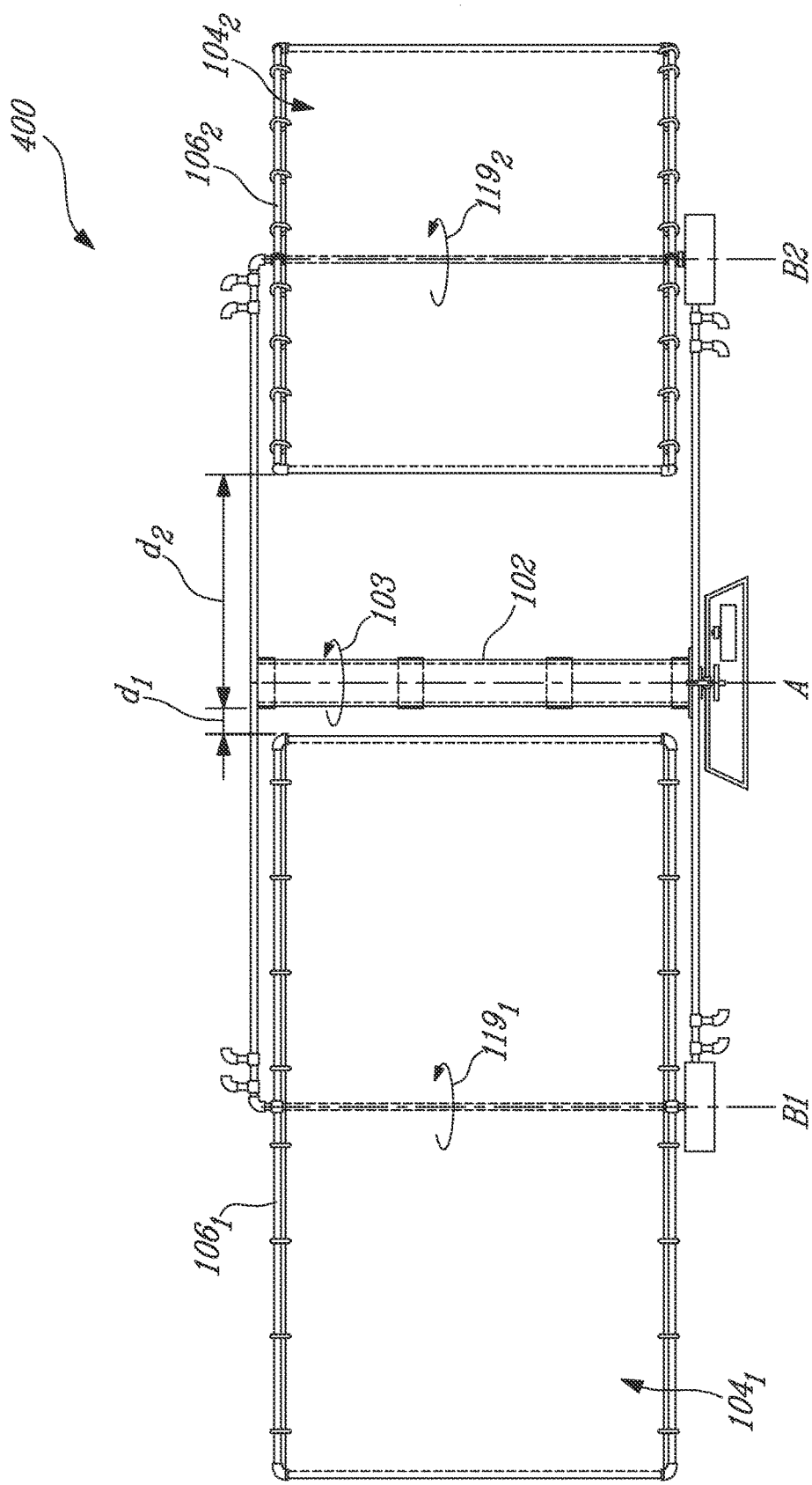
FIG. 2C is a front schematic diagram of a wind turbine, in accordance with another illustrative embodiment.

FIG. 2A further illustrates an embodiment where the distance d between all blades $104_1$, $104_2$, $104_3$ (and more particularly the frames, reference 106 in FIG. 1A) and an outer surface (not shown) of the central pole 102 is substantially equal to half the width of each frame 106. This ensures that the blades $104_2$, $104_2$, $104_3$ do not contact the reinforcement bar 202 or the central pole 102 while rotating. This embodiment is also illustrated in FIG. 2B. It should however be understood that other configurations may apply. For instance, for the wind turbine 400 illustrated in FIG. 2C, the distance $d_1$ between the frame $106_1$ of the blade $104_1$ and an outer surface (not shown) of the central pole 102 is minimized while the distance $d_2$ between the frame $106_2$ of the blade $104_2$ and the outer surface of the central pole 102 is set to be substantially equal to half the width of the frame $106_2$. When more than two (2) blades as in $104_1$, $104_2$ are provided, it is indeed desirable for the distance d to be above the minimum distance to take into account turbulence and allow mounting of reinforcement members, such as the reinforcement bar 202. The wind turbine 300 of FIG. 2B may further comprise additional reinforcement means, such as reinforcement poles 302, which are positioned substantially parallel to the central pole 102 and each extend between the pair of arms $112_1$ and $112_2$ connected to a given blade frame 106.

Figure 3A:
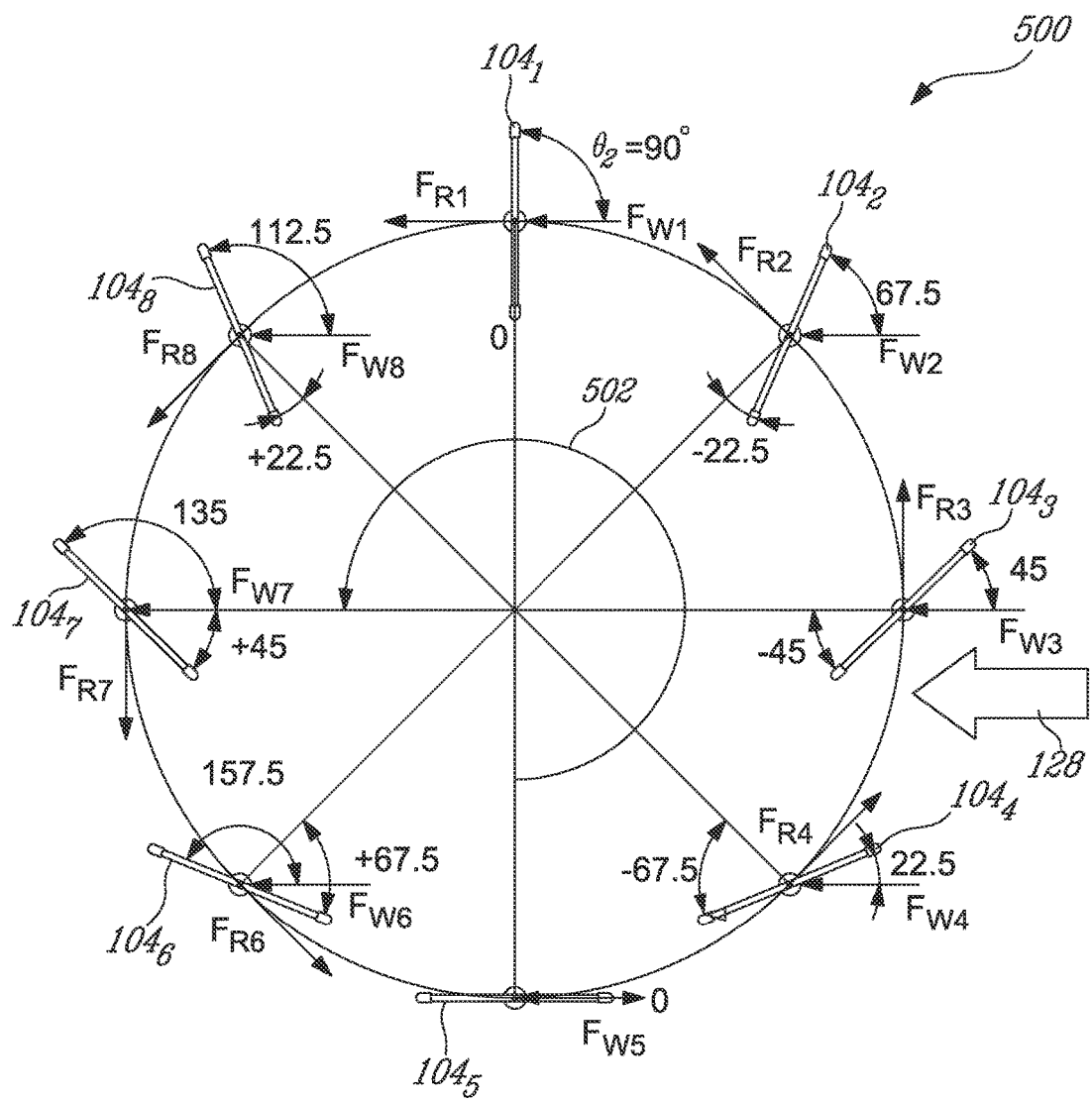
FIG. 3A is a top schematic diagram of a wind turbine showing wind forces and resultant forces exerted on the turbine blades, in accordance with an illustrative embodiment.

Referring now to FIG. 3A and FIG. 3B, there is illustrated a graphical representation of wind forces $F_{W1}$, $F_{W2}$, $F_{W3}$, $F_{W4}$, $F_{W5}$, $F_{W6}$, $F_{W7}$, and $F_{W8}$ and resultant forces $F_{R1}$, $F_{R2}$, $F_{R3}$, $F_{R4}$, $F_{R6}$, $F_{R7}$, and $F_{R8}$ (lengths of force lines illustrated as proportional to scale) upon wind 128 applying on a wind turbine system 500 that comprises eight (8) blades as in $104_1$, $104_2$, $104_3$, $104_4$, $104_5$, $104_6$, $104_7$, and $104_8$ and rotates in the direction of arrow 502 (i.e. counter-clockwise). The point of attachment of each one of the wind forces $F_{W1}$, $F_{W2}$, $F_{W3}$, $F_{W4}$, $F_{W5}$, $F_{W6}$, $F_{W7}$, and $F_{W8}$ and of the resultant forces $F_{R1}$, $F_{R2}$, $F_{R3}$, $F_{R4}$, $F_{R6}$, $F_{R7}$, and $F_{R8}$ is illustratively at the geometrical center of the blade frames. The resultant forces $F_{R1}$, $F_{R2}$, $F_{R3}$, $F_{R4}$, $F_{R6}$, $F_{R7}$, and $F_{R8}$ (with the resultant force exerted on blade $104_5$ not shown as it is null) are illustratively tangent to the rotation of the central pole (reference 102 in FIG. 1A).

Due to the above-mentioned forces, the blades as in $104_1$, $104_2$, $104_3$, $104_4$, $104_5$, $104_6$, $104_7$, and $104_8$ typically attempt to offer the least resistance to the wind 128 and therefore rotate in a same direction. In one embodiment, the blades $104_1$, $104_2$, $104_3$, $104_4$, $104_5$, $104_6$, $104_7$, and $104_8$ rotate by half a turn relative to their axis of rotation upon the wind turbine's central pole rotating by a full turn. Depending on the blades' position, some blades $104_1$, $104_2$, $104_3$, $104_4$, $104_5$, $104_6$, $104_7$, and $104_8$ will need to be rotated less in order to be in a position of least resistance to the wind 128. As such, the control of the blades' angular position (discussed further below) illustratively determines whether or not to adjust an angular position (by braking, inverting, and/or allowing or activating rotation) of a given blade depending on its present angular position and on wind direction detected by a wind sensor (not shown) connected to the wind turbine system 500.

As discussed above, the optimum position of the blade frames (reference 106 in FIG. 1A) relative to the direction of the wind 128 (and accordingly the angular correction) can be determined by the controller (reference 120 in FIG. 1A) so as to maximize the blade effectiveness in recovering energy from the wind. The controller 120 illustratively causes a brake assembly to adjust the blades' angle of incidence relative to wind direction at a predetermined time interval (e.g. fifty (50) times per second) by allowing free rotation, slowing down (braking), eventually stopping, or reversing the blades' rotation. When doing so (see FIG. 3B, which shows blade displacement over time upon application of wind pressure), the controller 120 ensures that, for a system with two blades, at any given time during rotation (e.g. in the clockwise direction indicated by arrow 504), the angle $\theta_1$ between two (2) adjacent blades, e.g. between blades $104_1$ and $104_2$, remains substantially equal to ninety (90) degrees at any given time. It should be understood that, for a wind turbine system with more than two blades, the angle $\theta_1$ between the blades may be different than ninety (90) degrees. This allows to prevent jerky corrective movements of the blades as in $104_1$, $104_2$, $104_3$, $104_4$, $104_5$, $104_6$, $104_7$, and $104_8$ while optimizing efficiency of the latter. As will be discussed further below, the corrective angular displacements ordered by the controller 120 may occur using magnetic induction, thus preventing mechanical contact with the blades as in $104_1$, $104_2$, $104_3$, $104_4$, $104_5$, $104_6$, $104_7$, and $104_8$. Other brake assemblies may also apply.

Figure 4A:
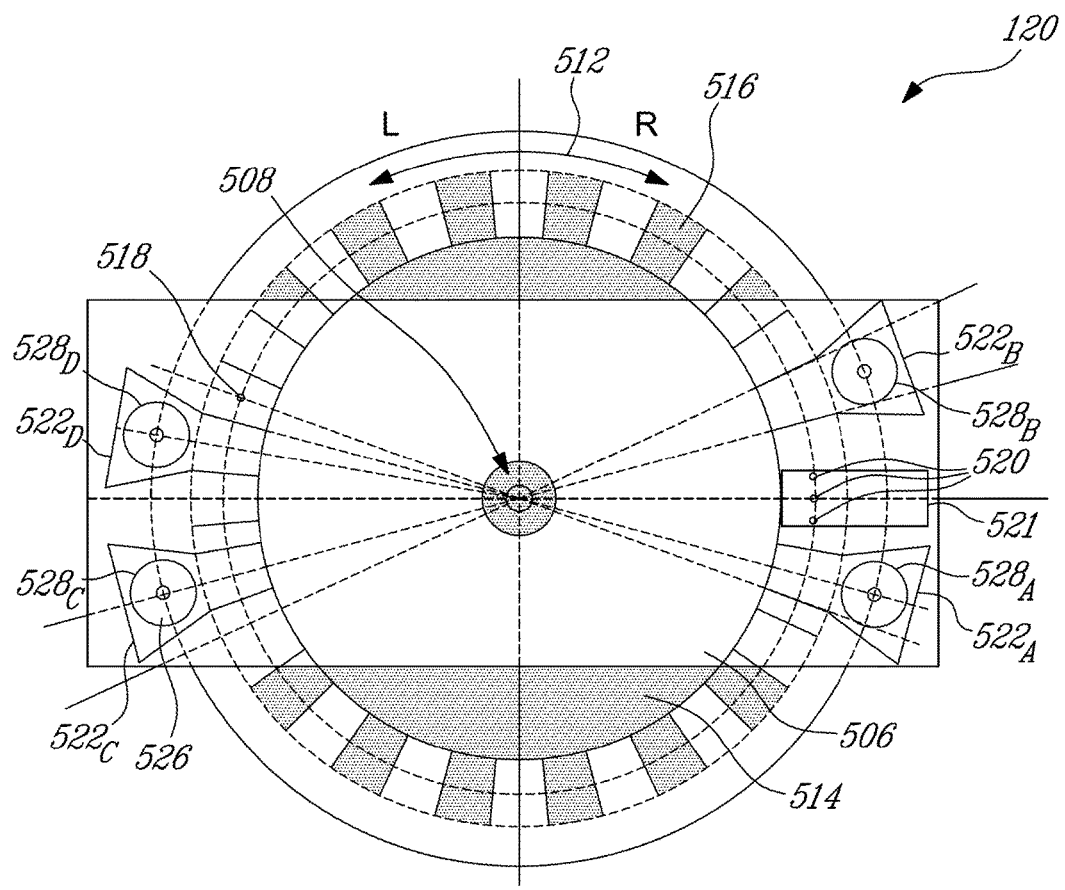
FIG. 4A is a top schematic diagram of a blade angular position control system, in accordance with an illustrative embodiment.
Figure 4B:
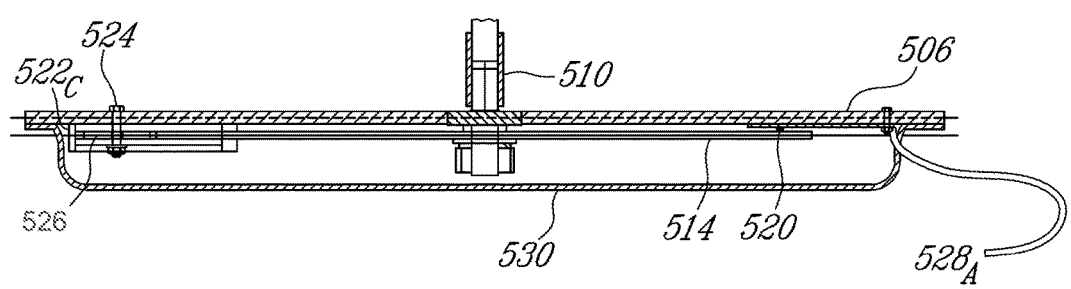
FIG. 4B is a side view of the control system of FIG. 4A.

Referring now to FIG. 4A and 4B, the blade angular positioning controller 120 will now be described. Although not illustrated, the controller 120 may comprise a processing unit for computing the desired angular correction in accordance with the wind direction and the present angular position of the blade. Alternatively, the angular correction may be computed at the controller provided at the generator 124 of FIG. 1A. The computed angular correction may then be sent to a brake assembly for performing the desired adjustment. For this purpose, the controller 120 illustratively comprises a substantially planar support member 506 receiving at a geometric center 508 thereof a rotary connection member 510. The connection member 510 illustratively comprises a rotating member (not shown), such as a ball bearing, and an elongate member, such as a shaft, (not shown) that has a longitudinal axis and extends therealong (not shown) substantially transverse to a plane (not shown) of the support member 506. The connection member 510 is configured to rotate clockwise or counter-clockwise about the longitudinal axis of the elongate portion, i.e. in the direction of arrow 512. A substantially planar disc 514 is attached to the connection member 510 (adjacent a lower surface, now shown, of the support member 506) in alignment with the support member 506 so that a geometric center (not shown) of the disc 514 is aligned with the geometric center 508. The connection member 510 may then extend through the support member 506 and the disc 51 along an axis passing through the aligned geometric centers. When so positioned, the disc 514 is substantially parallel to the support member 506 and spaced therefrom so as to be able to freely rotate in the direction of arrow 512 upon rotation of the connection member 510. angular correction may then be sent to a brake assembly for performing the desired adjustment. For this purpose, the controller 120 illustratively comprises a substantially planar support member 506 receiving at a geometric center 508 thereof a rotary connection member 510. The connection member 510 illustratively comprises a rotating member (not shown), such as a ball bearing, and an elongate member, such as a shaft, (not shown) that has a longitudinal axis and extends therealong (not shown) substantially transverse to a plane (not shown) of the support member 506. The connection member 510 is configured to rotate clockwise or counter-clockwise about the longitudinal axis of the elongate portion, i.e. in the direction of arrow 512. A substantially planar disc 514 is attached to the connection member 510 (adjacent a lower surface, now shown, of the support member 506) in alignment with the support member 506 so that a geometric center (not shown) of the disc 514 is aligned with the geometric center 508. The connection member 510 may then extend through the support member 506 and the disc 51 along an axis passing through the aligned geometric centers. When so positioned, the disc 514 is substantially parallel to the support member 506 and spaced therefrom so as to be able to freely rotate in the direction of arrow 512 upon rotation of the connection member 510.

The disc 514 may be made of any suitable material, such as soft iron, steel with high magnetic permeability, or the like. The disc 514 has formed at a perimeter thereof a plurality of slots as in 516 whose number illustratively defines the resolution of the rotation angle of the disc 514. The area and the minimum thickness of each slot 516 depends on the magnetic permeability of the material composing the disc 514. The slots 516 are equally spaced about the perimeter of the disc 514 and a given one of the slots 516 has formed therein an index position hole 518 adapted to cooperate with each one of three (3) position detectors as in 520 that may be formed (e.g. as protrusions) on a bottom surface of the support member 506. The position detectors 520 indeed detect the passage of the index position hole 518 as well as the passage of the slots 516. Detection of such passage results in generation of a signal, which is output at a position output line 521. Three (3) position detectors 520 are provided adjacent to one another to provide an indication of left, middle, or right position of a detected component. Voltage changes at each position detector 520 (resulting from detection of passage of a given component, e.g. slot 516 or index position hole 518) allow to determine a direction, a speed of rotation, as well as a position of the disc 514. Detection of the passage of the index position hole 518 is used as a reference point for the position of the disc 514. In one embodiment, upon assembly of the wind turbine system 100, the index position hole 518 is aligned with the blade support member (reference 115 in FIG. 1A) to which the controller 120 is coupled.

Magnetic activators $522_A$, $522_B$, $522_C$, and $522_D$, comprising horseshoe electromagnets (not shown) or any other suitable magnet, are further positioned at a lower surface of the support member 506 adjacent a perimeter (not shown) of the support member 506. The magnetic activators $522_A$, $522_B$, $522_C$, and $522_D$ are positioned symmetrically about the geometrical center 508 and extend radially therefrom. Fastening members, such as screws as in 524, are used to retain the magnetic activators $522_A$, $522_B$, $522_C$, and $522_D$ in place relative to the support member 506 and the disc 514.

The dimensions of the surface of each slot 516 illustratively match dimensions of an opening or air gap (not shown) of the horseshoe electromagnet of a given magnetic activator $522_A$, $522_B$, $522_C$, $522_D$. In this manner, an entire slot as in 516 may be received in the opening of a given magnetic activator $522_A$, $522_B$, $522_C$, $522_D$. Each slot 516 may then have a width (at the perimeter of the disc 514) equal to: (disc diameter*Pi)/(number of slots*2), with the diameter of the disc 514 being proportional to the object (e.g. a blade of the wind turbine) whose position is to be controlled and inversely proportional to the induction power of a given magnetic activator $522_A$, $522_B$, $522_C$, $522_D$. In one embodiment, the disc 514 has a diameter of eight (8) inches and a thickness of a quarter (¼) inch. Other dimensions may apply.

Each magnetic activator 522A, 522B, 522C, and 522D is further provided with an inductor coil 526 that is aligned with an edge (not shown) of the disc 514. Each magnetic activator 522A, 522B, 522C, and 522D (and the inductor coil 526 thereof) is powered via a corresponding one of power lines 528A, 528B, 528C, and 528D. The parameters that determine the strength of each one of the magnetic activators 522A, 522B, 522C, and 522D include the number of turns of the activator's inductor coil 526, the current passing through the coil 526, and the air gap of the electromagnet horseshoe constituting the magnetic activator 522A, 522B, 522C, or 522D. In one embodiment, each coil 526 is a solenoid of 4000 turns at a maximum current of 2mA. The magnetic activators 522A, 522B, 522C, and 522D are illustratively distributed relative to the disc 514 such that a given magnetic activator (e.g. magnetic activator 522A) is positioned on the right half of a given one of the slots 516, a given magnetic activator (e.g. magnetic activator 522B) is positioned so as to completely cover another one of the slots 516, a given magnetic activator (e.g. magnetic activator 522C) is positioned so as to completely cover a space between two consecutive slots 516, and a given magnetic activator (e.g. magnetic activator 522D) is positioned on the left half of another one of the slots 516. The position of each one of the magnetic activators 522A, 522B, 522C, and 522D is illustratively obtained by the position detectors 520.

It should be understood that this distribution is illustrative only and that other configurations may apply. Also, the order assigned to the magnetic activators $522_A$, $522_B$, $522_C$, and $522_D$ (as illustrated in FIG. 4A and FIG. 4B) is random. However, the sequential order of distribution of electrical pulses on each magnetic activator $522_A$, $522_B$, $522_C$, $522_D$ is such that the magnetic activator $522_A$, $522_B$, $522_C$, $522_D$ that is best positioned relative to a given crenel 516 is energized first. In particular, when the disc 514 is to be rotated in a clockwise direction (e.g. right rotation (R)), the magnetic activator $522_A$, $522_B$, $522_C$, $522_D$ positioned on (i.e. has received in an opening thereof) the left half of a slot 516 should be activated first. Indeed, such activation causes creation of a magnetic field win the given magnetic activator, resulting in the electromagnet tending to attract the slot 516 so as to also retain the remaining (or right) part thereof within the opening of the electromagnet. Thus, the slot 516 is moved towards the left, thereby activating the left rotation. Similarly, when the disc 514 is to be rotated in a counter-clockwise direction (e.g. left rotation (L)), the magnetic activator $522_A$, $522_B$, $522_C$, $522_D$ positioned on the right half of a crenel 516 should be activated first. For instance, in the illustrated example, for a left (L) rotation, the energizing sequence should be $522_A$-$522_D$-$522_C$-$522_B$. For a right (R) rotation, the energizing sequence should be $522_C$-$522_D$-$522_C$-$522_B$.

A protection cover 530 is illustratively secured to the bottom surface of the support member 506 to protect the controller components from the outside environment. space between two consecutive slots 516, and a given magnetic activator (e.g. magnetic activator 522D) is positioned on the left half of another one of the slots 516. The position of each one of the magnetic activators 522A, 522B, 522C, and 522D is illustratively obtained by the position detectors 520.

In operation, the bidirectional rotary motion (in the direction of arrow 512) of the disc 514 is controlled by electric pulse (energization of a coil 526 with the electric pulse inducing a magnetic field in the corresponding magnetic activator). The angular resolution of the disc's displacement is illustratively equal to: number of slots/ 4. Indeed, the disc 514 is illustratively displaced by half a slot 516 in response to application of the electric pulse. If none of the magnetic activators 522A, 522B, 522C, 522D is energized, the disc 514 rotates freely upon application of forces to the connection member 510. As discussed above, the position detectors 520 provide information about the direction of rotation of the disc 514 and the position of the slot surfaces arranged in the electromagnet gap of the magnetic activators 522A, 522B, 522C, 522D. Using information form the position detectors 520, it is possible to determine which one of the magnetic activators 522A, 522B, 522C, 522D is in the best position relative to its corresponding slot 516 and a decision to rotate the disc 514 clockwise or counterclockwise is made accordingly. Each angular displacement of the disc 514 is achieved by application of an electrical pulse whose duration is controlled by information received from the position detectors 520. In particular, using position information from the position detectors 520, it is possible to determine when the given slot 516 is in its final position and the system is ready to energize the next magnetic activator 522A, 522B, 522C, 522D in the activation sequence. In order to stop rotation of the disc 514 and retain the latter in a given angular position, the controller 120 may hold the electric pulse on the magnetic activator 522A, 522B, 522C, 522D for which the entire area of the electromagnetic gap is occupied by a slot 516. Using the controller 120, it then becomes possible to control the angle of incidence of a surface exposed to wind (e.g. a blade of a vertical-axis wind turbine) in order to improve the surface's effectiveness at capturing energy from the wind.

Referring now to FIG. 4C, in an alternative embodiment, a single controller 120' and corresponding brake assembly may be used to control the angular orientation of all turbine blades as in 104$_1$ and 104$_2$. In this case, the brake assembly may be positioned at the central pole (reference 102 in FIG. 1A). A connection 532, such as a toothed belt, may be used to connect the blades 104$_1$ and 104$_2$, whose rotary motions are therefore dependent. The connection 532 illustratively holds the angle between the blades 104$_1$ and 104$_2$ at ninety (90) degrees. When more than two (2) blades as in 104$_1$ and 104$_2$ are provided, the angle between the blades is illustratively different and may be held equal to sixty (60) degrees for three blades. The brake assembly used to brake or stop the blades as in 104$_1$ and 104$_2$ may then comprise a contact member 534 (e.g. a steel ball) used to apply pressure on the connection 532 (onto a disc, not shown, positioned adjacent the connection 532 and configured to rotate therewith) for stopping the latter. This in turn stops the rotation of the blades 104$_1$ and 104$_2$. It should be understood that since the blades 104$_1$ and 104$_2$ are interlocked and have dependent rotation, it is sufficient to brake a single one of the blades 104$_1$ and 104$_2$ for slowing down and/or stopping all blades 104$_1$ and 104$_2$ simultaneously. Also, in the illustrated embodiment, the brake assembly need not provide for bi-directional rotation (i.e. to correct an angular position of the blades 104$_1$ and 104$_2$), as was the case of the brake assembly of FIG. 1A, as the dependent movement of the blades 104$_1$ and 104$_2$ ensures that the latter always rotate in the right direction.

Figure 5A:
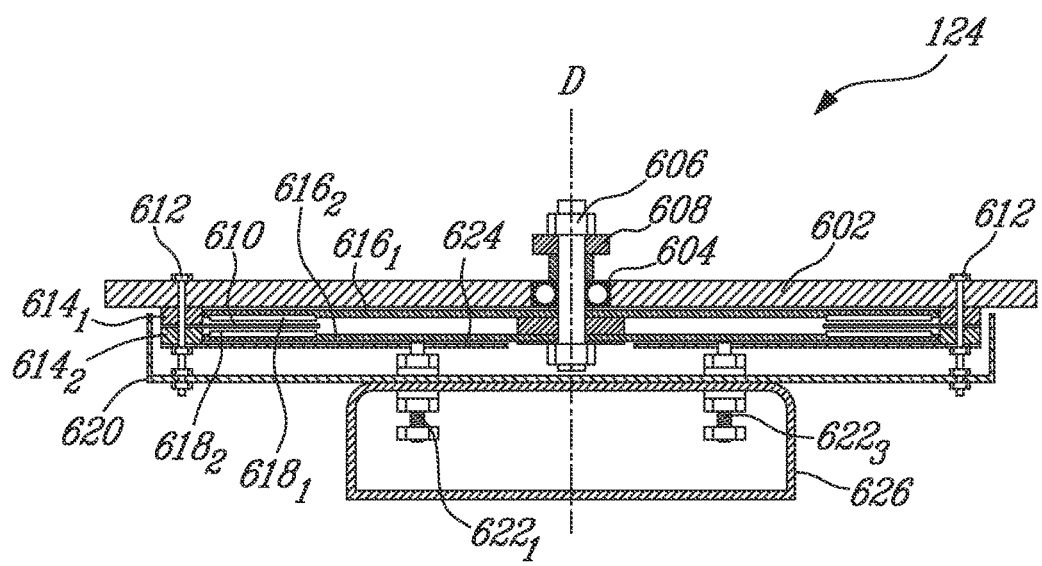
FIG. 5A is a schematic diagram of a generator for a wind turbine system, in accordance with an illustrative embodiment.
Figure 5B:
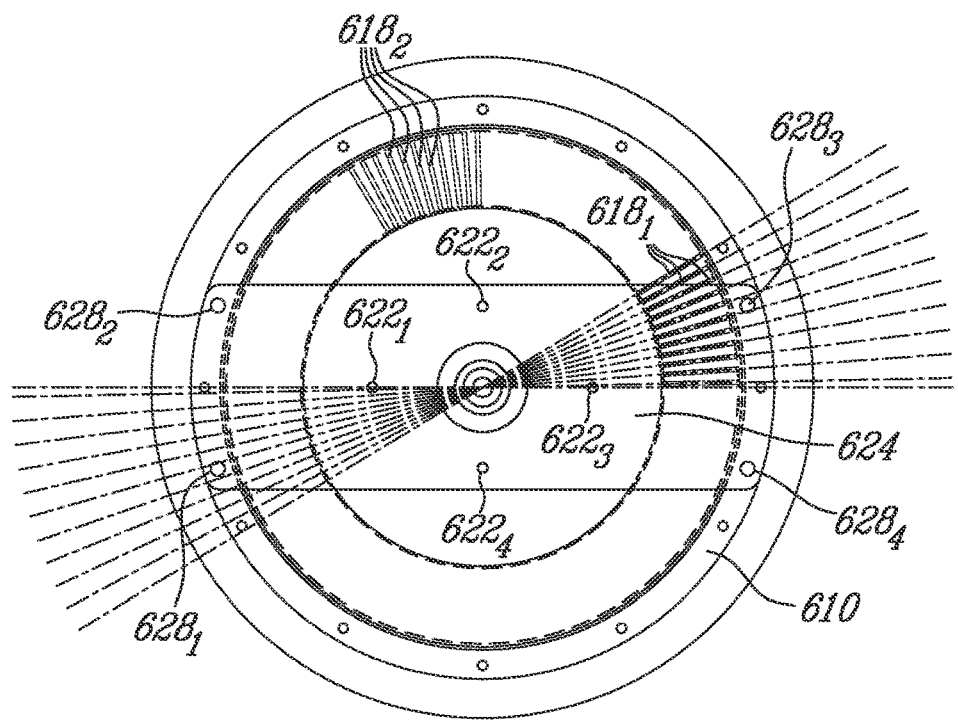
FIG. 5B is a top view of the generator of FIG. 5A.

Referring now to FIG. 5A and FIG. 5B, the wind turbine generator 124 will now be described. The generator 124 is illustratively a high performance current generator that is configured to be attached to wind turbine systems, such as the wind turbine system 100, and provide thereto average power (e.g. 4 kW to 20 kW).

The generator 124 comprises a substantially planar and circular base member 602, which may be made of steel, aluminum, or any other suitable material. The base member 602 is provided at a geometric center (not shown) thereof with a rotary connection 604, such as a ball bearing, that is configured to connect a central member 606 to the base member 602. In one embodiment, the central member 606 is connected to the central pole (reference 102 of FIG. 1A). When attached to the base member 602 via the rotary connection 604, the central member 606 extends away from the base member 602 along a longitudinal axis D and may rotate about the axis D in a clockwise or counter-clockwise. A drive pulley 608 is illustratively connected to the rotary connection 604 and the central member 606 for transferring energy from the central pole (102) to the generator 124.

The generator 124 further comprises an annular stator disc 610, which is positioned adjacent a lower face of the base member 602 and has formed therein an opening (not shown) through which the central member 606 may be received. The opening illustratively has a diameter that is larger than that of the central member 606. The stator disc 610 is illustratively implemented on a printed circuit board (PCB) and may be secured at an edge (not sown) thereof via suitable attachment means, such as clamping screws 612, to the base member 602. The stator disc 610 is positioned between a first (or upper) ring 614$_1$ and a second (or lower) ring 614$_2$ also secured to the base member 602 via the clamping screw 612. In particular, each clamping screw 612 may be configured to extend through cooperating holes (not shown) formed in the stator disc 610 and in the rings 614$_1$ and 614$_2$ provided adjacent the stator disc 610. In this manner, the stator disc 610 may be held in place relative to the rings 614$_1$, 614$_2$, with the stator disc 610 and the rings 614$_1$, 614$_2$ being positioned substantially parallel to one another and extending along planes substantially transverse to the axis D.

The stator disc 610 may further be centered between a first (or upper) rotor disc 616$_1$ and a second (or lower) rotor disc 616$_2$, which may be made of steel or any other suitable material. The rotor discs 616$_1$, 616$_2$ are illustratively attached to the central member 606 at the connection 604 such that the central member 606 extends through a first and a second central hole (not shown) respectively formed in the rotor disc 616$_1$ and the rotor disc 616$_2$. When so positioned, the rotor discs 616$_1$, 616$_2$ each extend in a direction substantially transverse to the axis D and are therefore substantially parallel. The rotor discs 616$_1$, 616$_2$ are illustratively spaced from the stator disc 610, the rings 614$_1$ and 614$_2$, and the base member 602 so as to enable free rotation of the rotor discs 616$_1$, 616$_2$ about the axis D upon rotation of the central member 606.

A first and a second plurality of permanent magnets 618$_1$, 618$_2$ are further provided, with the first plurality of permanent magnets as in 618$_1$ being secured to an internal (or lower) face (not shown) of rotor disc 616$_1$ and the second plurality of permanent magnets as in 618$_2$ being secured to an internal (or upper) face (not shown) of rotor disc 616$_2$. In this manner, the permanent magnets as in 618$_1$, 618$_2$ rotate relative to the stator disc 610 upon rotation of the central member 606 and of the rotor discs 616$_1$, 616$_2$ about the axis D, thereby generating a current in the stator disc 610. The generator 124 may further comprise a connection and protection panel 620 that is secured to the bottom surface of the base member 602 via the clamping screw 612 and may be used to protect the components constituting the generator 124 from the outside environment.

Output power connections (e.g. copper screws) as in 622₁, 622₂, 622₃, and 622₄ are further provided. The power outputs 622₁, 622₂, 622₃, and 622₄ enable connection to the electrical grid for supplying thereto the power output of the generator 124. For this purpose, a first end (not shown) of each screw 622₁, 622₂, 622₃, or 622₄ is attached (using screws, fasteners, or the like, now shown) to a printed circuit controller 624 (discussed further below) that is positioned adjacent the rotor disc 616₂ (and spaced therefrom) and held in place via the clamping screw 612. A second end (not shown) opposite to the first end of the screw 622₁, 622₂, 622₃, or 622₄ then extends away from a lower surface of the panel 620 and into a connection box 626. The power outputs 622₁, 622₂, 622₃, and 622₄ are illustratively positioned symmetrically about the axis D. The generator 124 further comprises four (4) current outputs as in 628₁, 628₂, 628₃, or 628₄ positioned symmetrically about the axis D. The generator 124 illustratively comprises four (4) power outputs as in 622₁, 622₂, 622₃, or 622₄ and four (4) current outputs as in 628₁, 628₂, 628₃, or 628₄ in order to enable the generator 124 to adapt to any type of electric power system, i.e. from a system having a single phase to a system with four (4) phases.

Figure 6B:
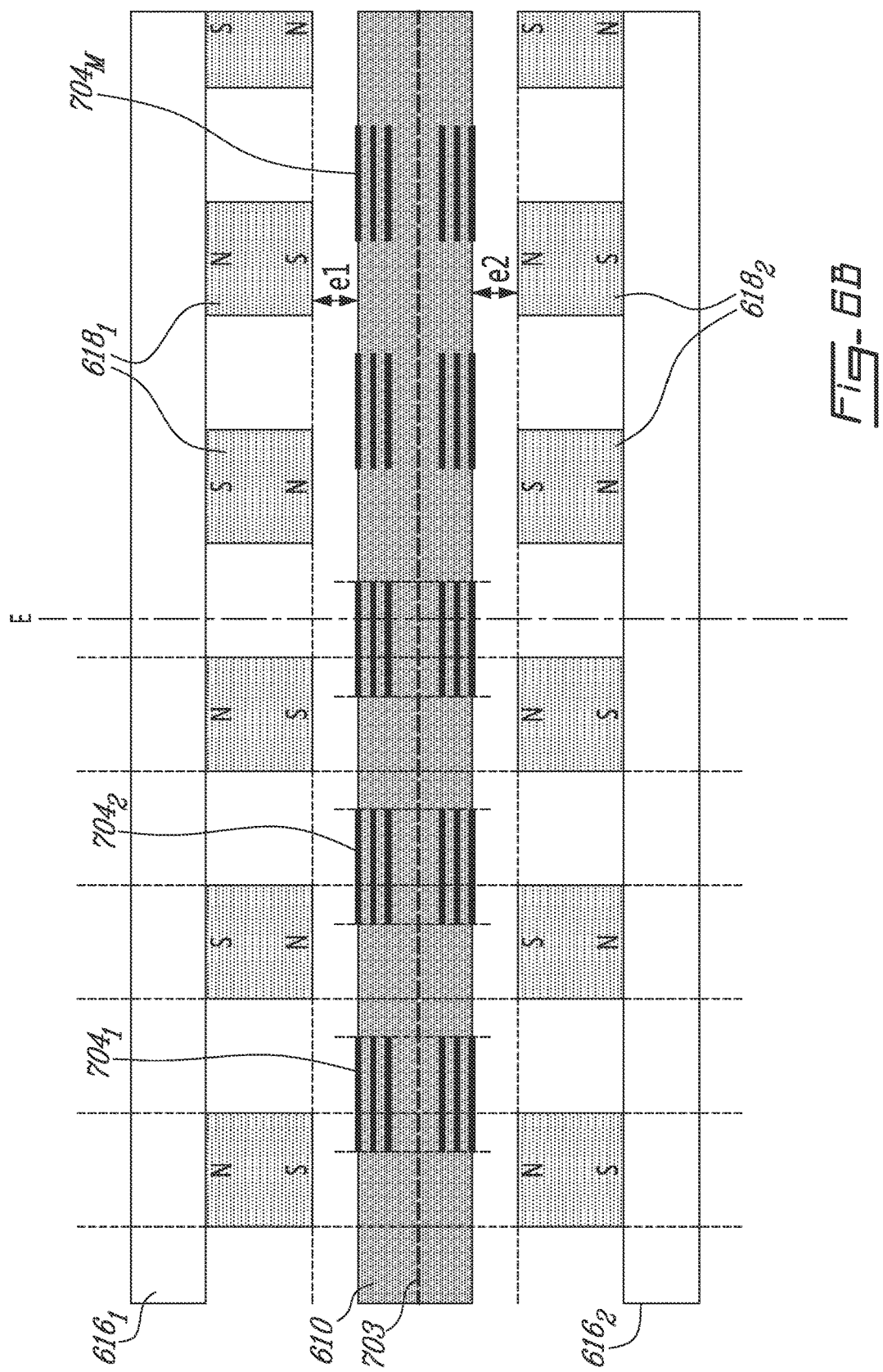
FIG. 6B is a detailed view of FIG. 1A.

Referring now to FIG. 6A and FIG. 6B in addition to FIG. 5A and FIG. 5B, the generator's rotor component illustratively comprises the central member 606, the first (or upper) rotor disc 616₁, and the second (or lower) rotor disc 616₂, the discs 616₁ and 616₂ being integral with the central member 606 and rotating with the latter about the central axis of rotation D without contacting the base member 602, the rings 614₁, 614₂, the stator disc 610, or the printed circuit controller 624. In one embodiment, the rotor discs 616₁ and 616₂ are designed to have a diameter slightly smaller than the diameter of the printed circuit controller 624.

As discussed above, a first plurality of permanent magnets as in 618₁ is aligned on the upper surface (not shown) of the rotor disc 616₁ while a second plurality of permanent magnets as in 618₂ is aligned on the lower surface (not shown) of the rotor disc 616₂. The magnets 618₁, 618₂ illustratively extend radially away from (i.e. placed in a fan around) the central axis D. On a given rotor disc 616₁ or 616₂, the magnetic pole induction (or polarity) of the corresponding plurality of magnets as in 618₁ or 618₂ is alternately positive and negative (see FIG. 6B). In addition, each one of the first plurality of magnets as in 618₁ is positioned so as to be precisely aligned (along the direction of axis E) with a corresponding one of the second plurality of magnets as in 618₂, thereby facing the latter. The magnetic pole induction of the first plurality of magnets as in 618₁ is further opposite to the magnetic pole induction of the second plurality of magnets as in 618₂. Also, in order to enable free rotation of the rotor discs 616₁ and 616₂, the first plurality of magnets 618₁ is illustratively spaced from the stator disc 610 by a distance $e_1$ while the second plurality of magnets 618₂ is illustratively spaced from the stator disc 610 by a distance $e_2$. The distances $e_1$ and $e_2$ are substantially equal to one another and as small as possible so as to decrease the size of the overall system.

Still referring to FIG. 6A and FIG. 6B in addition to FIG. 5A and FIG. 5B, the generator 124 illustratively generates current without the use for any winding wire. For this purpose, the stator disc 610 is implemented as a circular multilayer printed circuit board comprising a plurality (N) of layers as in 702₁, 702₂, . . . , 702$_N$ positioned in parallel along the direction of axis E. Although the stator disc 610 is illustrated as comprising six (6) layers as in 702₁, 702₂, . . . , 702$_N$, it should be understood that more or less layers may be used. Each layer 702₁, 702₂, . . . , 702$_N$ is then divided into a plurality (M) of identical cells as in 704₁, 704₂, . . . , 704$_M$ in which current is generated. The cells 704₁, 704₂, . . . , 704$_M$ of any given layer 702₁, 702₂, . . . , 702$_N$ are aligned along the direction of axis E (e.g. layered) with the cells 704₁, 704₂, . . . , 704$_M$ of the adjacent layer(s) 702₁, 702₂, . . . , 702$_N$. The stator cells as in 704₁, 704₂, . . . , 704$_M$ are then equally distributed around the central axis D and extend radially away therefrom. A flat winding wire or coil 706 may be used to create each cell as in 704₁, 704₂, . . . , 704$_M$, the coil 706 consisting of a plurality of turns whose number depends on the dimensions (e.g. width and length) of the cell as in 704₁, 704₂, . . . , 704$_M$ as well as on the width of copper traces on the circuit board used to implement the stator disc 610.

Each cell as in 704₁, 704₂, . . . , 704$_M$ in a given layer as in 702₁, 702₂, . . . , 702$_N$ is positioned adjacent a first one and a second one of the first plurality of permanent magnets as in 618₁, and adjacent a first one and a second one of the second plurality of permanent magnets as in 618₂, for a total of four (4) magnets as in 618₁, 618₂ per cell 704₁, 704₂, . . . , 704$_M$. The number of the corresponding plurality of magnets as in 618₁ or 618₂ is set to be twice the number (M) of stator cells 704₁, 704₂, . . . , 704$_M$ with the number of cells 704₁, 704₂, . . . , 704$_M$ being even. The number of stator cells as in 704₁, 704₂, . . . , 704$_M$ thus determines the number of poles of the generator 124.

Still referring to FIG. 6A and FIG. 6B, an interconnection layer 703 may be provided for outputting current generated in the layers (upon positioning of magnets adjacent the cell windings during rotation of the rotor assembly relative to the stator assembly) via an output connection port, as in port 628₄. Vias as in 705 may also be used to connect the various layers together, with the layers provided in a parallel relationship. In particular, the interconnection layer 703 may be a central one of the layers as in 702₁, 702₂, . . . , 702$_N$ used to interconnect vias 705 of each group of overlapping cells as in 704₁, 704₂, . . . , 704$_M$ (connected in series and/or parallel) and forward to the four (4) current outputs (see FIG. 5B): It should be understood that the layers may also be provided in a series relationship, thereby alleviating the need for the vias 705. In addition, all of the cells as in 704₁, 704₂, . . . , 704$_M$ are illustratively divided into three (3) groups, each group of the three feeding a current output. The fourth current output may be common to all three groups of cells as in 704₁, 704₂, . . . , 704$_M$ and serve as ground.

Figure 7:
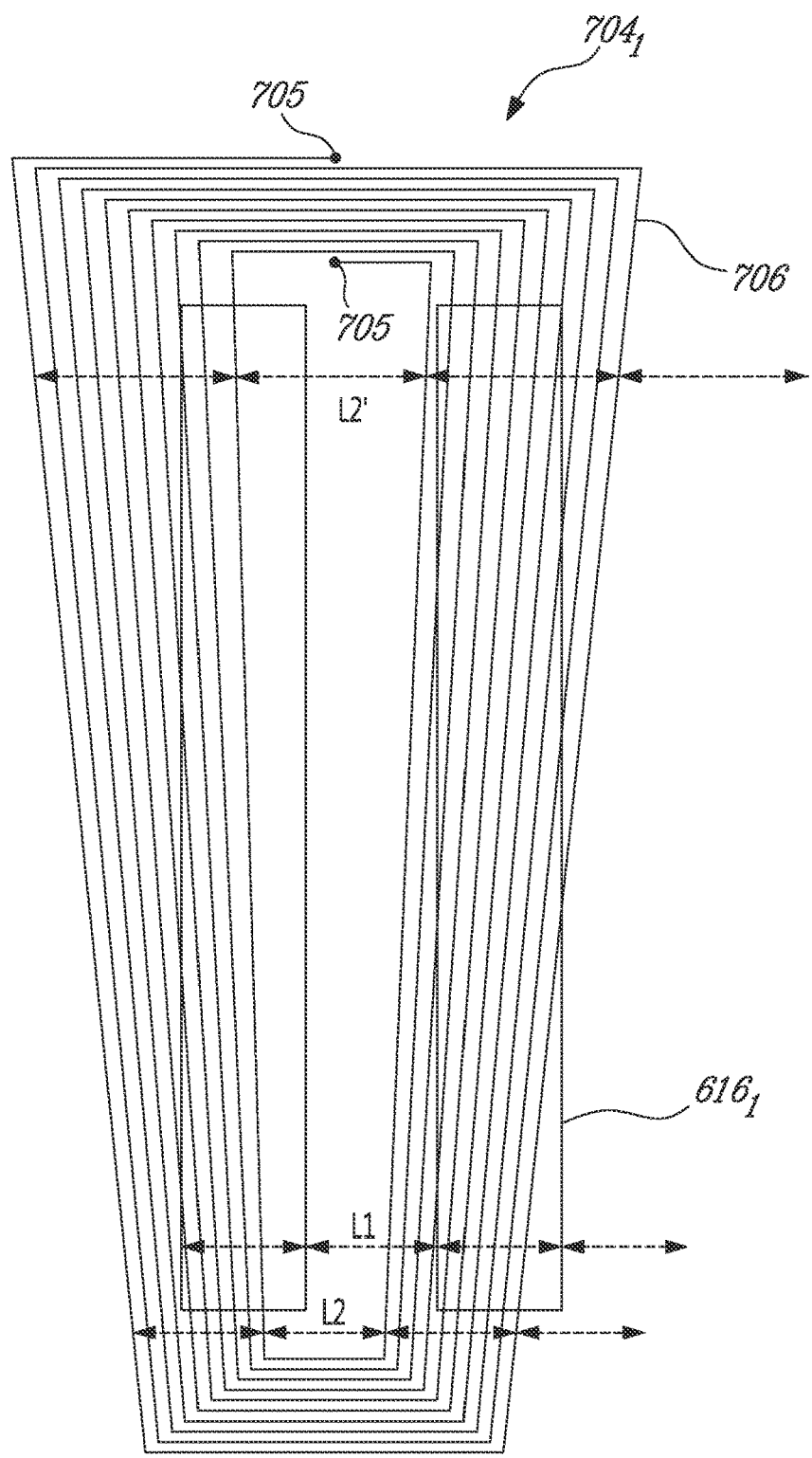
FIG. 7 is a schematic diagram of a stator cell and of rotor magnets, in accordance with an illustrative embodiment.

Referring now to FIG. 7 in addition to FIG. 6B, each stator cell as in 704₁, 704₂, . . . , 704$_M$ is illustratively trapezoidal (formed of an electrical conductor wound in several turns or loops). The width L1 of each one of the plurality of permanent magnets as in 618₁ or 618₂ is set to be substantially equal to a distance L2 (or lower inner cell diameter) between lower inner traces of a given stator cell 704₁, 704₂, . . . , or 704$_M$, with the width L2' between upper inner traces being greater than the width L2. In one embodiment, adjacent ones of the permanent magnets as in 618₁ and 618₂ are also spaced from one another by a distance substantially equal to the width L1 and to a quarter of the overall bottom width (not shown) of a cell as in 704₁, 704₂, . . . , 704$_M$.

In one embodiment, the overall width of a cell as in 704₁, 704₂, . . . , 704$_M$ at a base of the trapezoid is equal to three (3) times the width L1 of each one of the permanent magnets as in 618₁ and 618₂. The surface area of a central cavity (not shown) of a cell as in 704₁, 704₂, . . . , 704$_M$ is also illustratively equal to the total surface area of each one of the permanent magnets as in $618_1$ and $618_2$. The point source lines (or vias 705) of each cell as in $704_1, 704_2, \ldots, 704_M$ are also aligned on the axis of rotation the cell as in $704_1$, $704_2, \ldots, 704M$, the latter being wider at an upper part thereof. Increasing the upper part width depends exclusively on the number of cells as in $704_1, 704_2, \ldots, 704_M$ and their lengths. To optimize the efficiency of each cell as in $704_1$, $704_2, \ldots, 704_{1\ M}$, the gap between successive loops of the coil 706 illustratively remains constant and each coil 706 progressively increases in width in order to create the trapezoidal shape.

Figure 8:
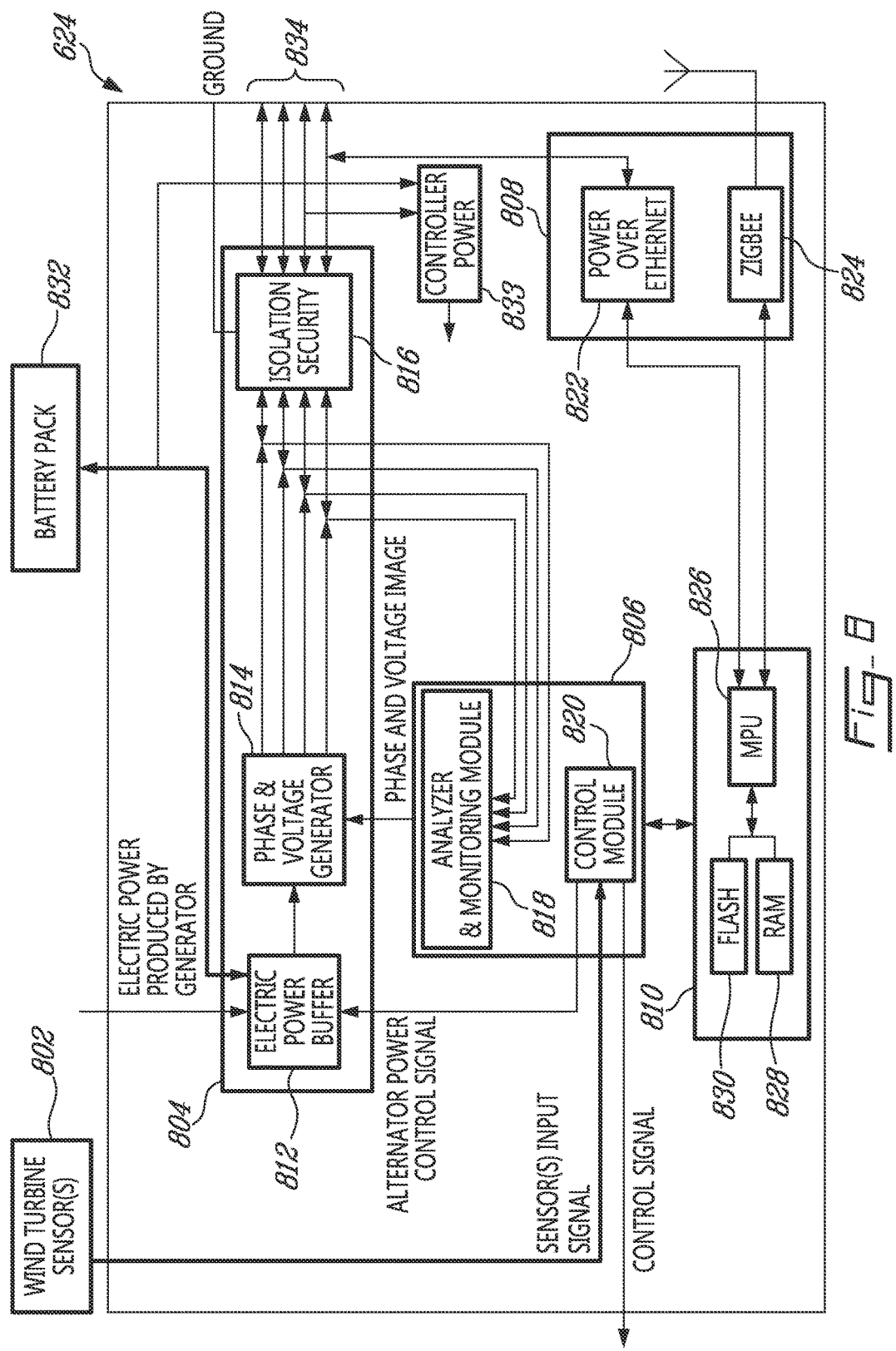
FIG. 8 is a schematic diagram of a control system for a wind turbine, in accordance with an illustrative embodiment.

Referring now to FIG. 8, the controller 624 will now be described. The controller 624 illustratively supports several functions of the generator 124, including the control of the generator's output, monitoring of the generator's efficiency (and that of the wind turbine system, reference 100 in FIG. 1A), and monitoring of the operation of the generator 124. When monitoring the efficiency of the generator 124, the controller 624 may periodically receive data from a plurality of sensors as in 802, such as voltage, current, and temperature, sensors positioned in the generator 124. The results of received sensor readings are then evaluated at the controller 624, their logic analyzed and cross-checked to stored information and actions executed in real-time by the controller 624, if necessary. For instance, the voltage sensors may be used to measure the voltage generated by the generator 124, the current sensors to measure the amperage generated by the generator 124, and the temperature sensors to measure the internal temperature of the generator's stator components. In one embodiment, the voltage and current sensor readings are acquired at a reading frequency of 60,000 times per second while the temperature readings are acquired at 10 times per second. Using the received sensor data, the controller 624 may then determine the voltage and current output by the generator 124 and regularly adjust the voltage and current, as needed. The controller 624 may further determine the speed of rotation of the generator's rotor components and assess therefrom the performance of the generator 124.

The controller 624 may also receive data from at least one wind sensor and accordingly independently enable (or disable) groups of stator cells (reference $704_1, 704_2, \ldots, 704_M$ in FIG. 5B) in order to maintain the performance and average rotation speed of the wind turbine system 100 according to wind speed. Also, if the sensor data indicates that the wind speed exceeds a predetermined threshold defined by the mechanical characteristics of the wind, the controller 624 may generate control signals to cause a reduction of the effectiveness of the wind turbine's blades (reference $104_1$ and $104_2$ in FIG. 1A) to capture wind energy. In this manner, the output of the generator 124 can be controlled and turbine performance optimized for all wind speeds (e.g. from 2 km/h to 75 km/h). Also, the sensor data may indicate the direction of the wind and this information may be used by the controller 624 to adjust the direction of the turbine blades accordingly.

The controller 624 may further receive data from one or more position sensors positioned at specific locations on the wind turbine system 100. For instance, one or more position sensors may be positioned adjacent the central pole (reference 102 in FIG. 1A) and provide an indication of a position of the latter. This information may then be used by the controller 624 to adjust an angular position of the blade's frames (reference 106 in FIG. 1A) and define the rotational speed of the wind turbine system 100. One or more position sensors may measure a position of the frames 106 and this information may be also used by the controller 624 to adjust the angular position of the frames 106.

The controller 624 illustratively comprises a power translation module 804, a processing unit 806, which may be implemented on a field-programmable gate array (FPGA), a communication module 808, and a memory module 810. The power translation module 804 illustratively comprises an electric power buffer 812, a phase and voltage generator 814, and isolation circuitry 816. The processing unit 806 illustratively comprises an analyzer and monitoring module 818 and a turbine control module 820. The communication module 808 illustratively comprises one or more transmission devices, such as a Power over Ethernet (PoE) module 822 and a ZigBee module 824. It should be understood that other transmission devices may also apply and that at least one of the PoE module 822 and the ZigBee module 824 may be used. The memory module 810 illustratively comprises a Memory Protection Unit (MPU) 826 and one or more memory components, such as a Flash memory 828 and a random-access memory (RAM) 830.

Upon the controller 624 being powered (from power produced by the generator 624 itself and/or by a batter pack 832, via the power controller 833), the communication module 808, may first initialize communications with turbine components as well as with the environment external to the wind turbine system (reference 100 in FIG. 1A). In particular, the presence and functional status of the wind turbine sensors 802 may first be declared and enabled through the communication module 808. The communication module 808 may further communicate with the electric power system (e.g. the electrical grid network) (to which the controller 624 is connected via lines as in 834) for confirming the network characteristics and connecting thereto prior to supplying thereto the power produced by the generator 624. Connection to the electrical grid is illustratively fully automated and continuously monitored and controlled. In particular, the controller 624 determines the type of network power and the logic of connection to the grid (e.g. voltage, i.e. 110V, 220V, or 440V, phase, number of active lines). This may be achieved by the controller 624, and more particularly the analyzer and monitoring module 818, performing one or more test and analyses on the grid.

Upon completion of the analyses, the controller 624 may then determine whether connection to the grid may be performed for supplying power thereto. A confirmation message to that effect may be generated at the processing unit 806 for transmission and rendering on a device, such as a smart phone, computer, portable digital assistant, tablet, or the like, for viewing by a user. In particular, in the event of refusal of the connection, the processing unit 806 may generate a message indicating reasons for the refusal. Once the connection has been approved, the controller 624 may connect the generator 124 to the grid for supplying power (e.g. the generated current) thereto. In one embodiment, the controller 624 regularly disconnects the generator 124 form the electrical grid in order to validate produced signals. This disconnection and validation may also be done if the controller 624 detects abnormalities on the grid.

Since the generator 124 produces an alternating current with variable frequency (e.g. between 80 and 160 Hz) and voltage (e.g. between 100 and 200V) that depend on wind speed and on the number of activated stator cells, the controller 624 may further adjust the received power prior to transmission to the grid. The produced power may be received at the electric power buffer 812, which is configured to raise the level of the received power to a voltage level higher than that of the grid for reconstitution of the signal power on each one of the lines 834. In one embodiment, the generator 124 produces power between 100 to 200V (at a maximum of 40 A). The electric power buffer 812 then raises the level of the received power to 400V, which is above the level of the grid (340V). A multi-stage booster may be used to raise the voltage level, the frequency of transfer of the booster being the highest possible in order to limit the size of the controller's electronic components. The raised power may then be momentarily stored in the electric power buffer 812 until the controller 624 has received authorization to connect to the grid and supply power thereto. In particular, the raised power may then be output to capacitors (not shown) for storage using a first output port (not shown) for positive voltage (e.g. from +100 to +200V) and a second output port (not shown) for negative output voltage (e.g. from −100 to −200V). The amount of power that may be stored in the electric power buffer 812 (e.g. using the capacitors) illustratively depends on the desired rate of power transfer to the grid. In one embodiment, the power transfer rate is 128 kHz.

The analyzer and monitoring module 818 illustratively periodically samples and records the frequency and voltage of each line as in 834 connected to the controller 624. For this purpose, voltage and current sensors (not shown) may periodically take measurements on the lines 834 and send the readings to the analyzer and monitoring module 818. For instance, the voltage sensors may acquire at 120,000 times per second (or 2,000 readings per cycle) measurements of the voltage applied to the grid on each one of the lines 834. The current sensors may acquire at 120,000 times per second (or 2,000 readings per cycle) measurements of the current returned to the grid on each one of the lines 834. The voltage and current information may then be used by the controller 624 to control the voltage and phase of the current supplied to the grid. As discussed above, any abnormality may cause immediate shutdown and disconnection from the grid.

The analyzer and monitoring module 818 may digitally record one cycle for each line 834 and use the recordings to control the time at which the power stored in the electric power buffer 812 should be injected into the grid. In particular, images of the cycle may be digitally stored and used by the analyzer and monitoring module 818 to determine whether it is suitable to supply current to the grid. The analyzer and monitoring module 818 may compare an image of the cycle captured at a present time to a previously captured image to determine whether the images are the same. If this is the case, it is determined that current may be supplied to the grid. Otherwise, a new sampling of the cycle is performed. The power is illustratively supplied into the grid by pulses, i.e. during a short timeframe, at specific points (or steps) of the cycle. This is illustratively done to maintain the grid voltage level at a predetermined level, e.g. 200V. In the example where the sampling rate is 128 kHz at 12 bits of resolution, for a network with 60 cycles, the image of a cycle is represented by 128 k/60=about 2133 voltage values or 533 values per quarter cycle. A quarter cycle thus goes from zero (0) volts to about 150V, i.e. a resolution of 200 mV (150/533). Thus, in this example, current is injected into the grid 128,000 times per second or for each 200 mV step (whether positive or negative). The analyzer and monitoring module 818 may further use the recordings to monitor the grid's stability as well to as to validate that the power produced by the generator 124 was transferred properly to the grid. The analyzer and monitoring module 818 may further use the recordings to determine whether the power produced by the generator 124 should be adjusted, e.g. increased or decreased, according to the present status of the grid. Control signal(s) to this effect may be generated by the control module 820.

In particular, the analyzer and monitoring module 818 and the phase and voltage generator 814 illustratively cooperate to capture and reconstruct the signal on each active wire power output to the grid and place the reconstructed signal in line with the grid. The signals may be reconstructed using as a reference the stored frequency and voltage of a cycle for each of the lines 834 previously obtained at the time of connection to the grid. In one embodiment, reconstruction of the digital output signal to the network is illustratively performed at a frequency of 120 kHz (digital-analogue conversion), and then filtered. The reconstruction is performed so as to preserve the frequency, voltage and phase of each line of output power (e.g. 110V at 60 cycles/second, 220V at 60 cycles/second, and 220V at 50 cycles/second). The analyzer and monitoring module 818 and the phase and voltage generator 814 may then check the perfect symmetry between the reconstructed signal and the network and adjust the reconstructed signal if necessary. In one embodiment, it is desirable for the correlation of the two signals to remain, without correction, for a predetermined time interval (e.g. a minimum of five (5) seconds) before the controller 624 is allowed to transfer power to the grid. Illustratively, power transfer for each line as in 834 is controlled independently from power transfer for remaining ones of the lines as in 834.

Power transfer to the grid is illustratively performed by the phase and voltage generator 814 at the zero crossing of the AC cycle. For this purpose, the phase and voltage generator 814 comprises Analog-to-Digital converters (ADC) (not shown), one per line power, that enslave one or more switches (e.g. power MOSFETs) that operate in an "all or nothing" state. In particular, the power stored in the capacitors of the electric power buffer 812 is sent to the phase and voltage generator 814 where the ADC converters convert the AC power from the generator 124 to DC power. The DC power is then supplied to the switches, which close to transfer the power to the grid. The opening times of the switches illustratively depend on the voltage level at the capacitors and on the present voltage of a given cycle. In particular, the controller 624 may determine the amount of power stored in the capacitors and accordingly assess the amount of current that may be supplied to the grid. When little power is stored in the capacitors (because less power is supplied by the generator 124), the controller 624 reduces the opening times of the switches, and vice versa. In one embodiment, the capacitors have a voltage of 200V and the cycle voltage is between 0 and +/−150V. Thus, the switches' opening times varies between 0 and 1 microseconds with a resolution of 0.2 microsecond.

After closing of the switch(es), the power is illustratively sent to the isolation security module 816, which may comprise fuse cutoffs connected in series on each line as in 834 of output power, prior to supply of the power to the grid.

After each power transfer, the voltage drop in the capacitors may be measured (e.g. by and ADC) and used for adjusting the next power transfer time. In particular, the power transfer time may be adjusted to maintain a desired voltage (e.g. 200V) at the capacitors' terminals. If the capacitors' voltage level does not return to the desired voltage before the next power transfer, the power transfer time of the switches will be reduced, and vice versa.

During power transfer, the communication module 808 may be used to communicate in real time with the outside environment. Any suitable communication protocol, such as the IP communication protocol standard, may be used to provide information about the efficiency and operating state of the generator 124 and overall wind turbine system 100. The power generated may be stored in the memory module 810 and compiled over predetermined time intervals, such as per day, per month, per year, or for all years since inception. The processing unit 806 may then retrieve and format the stored data for transmission (via the communication module 808 and over a suitable network) to devices, such as mobile phones, computer, portable digital assistants, tablets, or the like, for access by a user. Upon detection by the analyzer and monitoring module 818 of an abnormality, the processing unit 806 may also generate messages to this effect for transmission. Data may also be distributed to a web page format (HTML) application or other interface that support the Internet Protocol. Data may also be sent to a preconfigured address (e.g. email address or telephone number).

In addition, the turbine control module 820 may be used to control operation of the wind turbine system 100 further to monitoring thereof by the sensor(s) 802. For this purpose, the turbine control module 820 may receive the sensor data, process and analyze the received data, and output one or more control signals to the wind turbine system 100 for controlling operation thereof. The control signal(s) may for instance cause a direction and/or angular position of the turbine's blades to be adjusted, as discussed above.

Figure 9A:
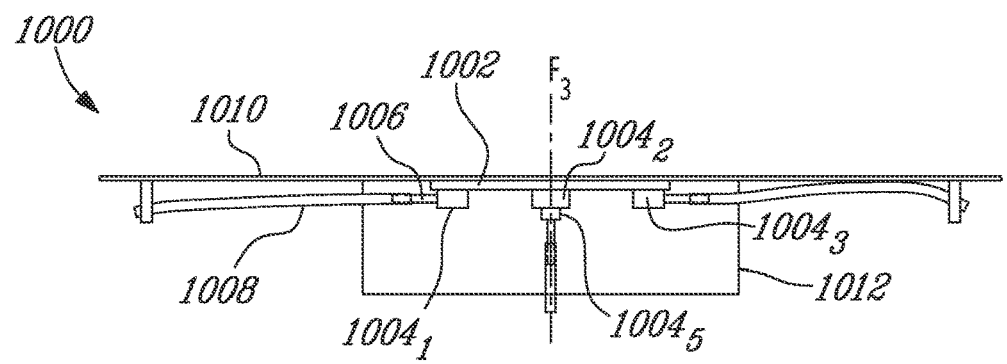
FIG. 9A is a side schematic diagram of a wind sensor module, in accordance with an illustrative embodiment.
Figure 9B:
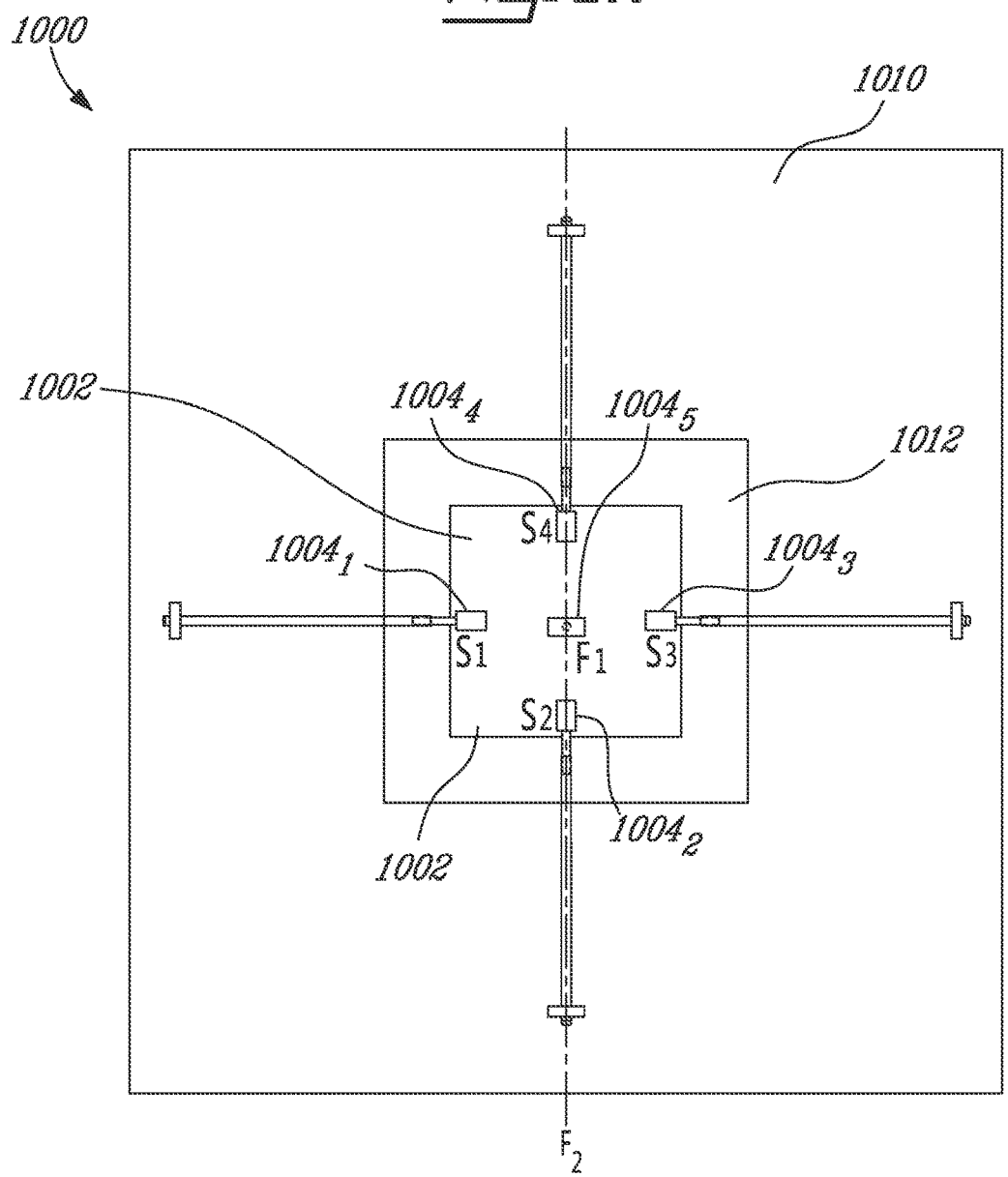
FIG. 9B is a top view of the wind sensor module of FIG. 9A.

Referring now to FIG. 9A and FIG. 9B, a wind sensor module 1000 for use with a wind turbine system as in 100 in FIG. 1A will now be described. The wind sensor module 1000 provides information on wind direction and strength. For this purpose, the wind sensor module 1000 illustratively comprises a printed circuit board 1002 on which are mounted a plurality of sensors. In one embodiment, four (4) pressure sensors as in $1004_1$, $1004_2$, $1004_3$, and $1004_4$ are arranged horizontally along a plane (not shown) substantially parallel to a plane of the printed circuit board 1002 so as to enable horizontal air intake. The sensors $1004_1$, $1004_2$, $1004_3$, and $1004_4$ are further positioned so as to be diametrically opposite with respective air intakes as in 1006 thereof extending away from the printed circuit board 1002. In particular, sensors are illustratively positioned so as to extend along a same axis $F_1$ while sensors are positioned so as to extend along a same axis $F_2$, axes $F_1$ and $F_2$ being substantially perpendicular to one another and crossing at a geometric center (not shown) of the printed circuit board 1002. A fifth sensor $1004_5$ is further positioned at the geometric center of the printed circuit board 1002 and arranged such that the air intake 1006 thereof extends away from the printed circuit board 1002 along an axis $F_3$ substantially transverse to the plane of the printed circuit board 1002. In one embodiment, the air intake 1006 of each sensor $1004_1$, $1004_2$, $1004_3$, $1004_4$ or $1004_5$ is illustratively connected to an extension tube as in 1008, that may be made of any suitable material, such as nylon, and provide an extension of the air intakes 1006.

The wind sensor module 1000 may further comprise a substantially planar protector 1010 configured to be positioned over the printed circuit board 1002 for protecting an exposed (or upper) surface thereof from the outside environment, e.g. from rain, snow, and the like. A hermetic protective box 1012 may also be provided. The protective box 1012 is illustratively configured to be secured to a bottom surface (not shown) of the protector 1010 so as to cover the printed circuit board 1002 as well as the sensors $1004_1$, $1004_2$, $1004_3$, $1004_4$, $1004_5$ and their respective air intakes as in 1006. The protective box 1012 may be used to seal the sensors $1004_1$, $1004_2$, $1004_3$, $1004_4$, $1004_5$ from the outside environment while only the extension tubes as in 1008 remain exposed to the outside environment. The wind sensor module 1000 components are therefore mechanically static, thereby allowing for a long lifespan without maintenance.

Figure 9C:
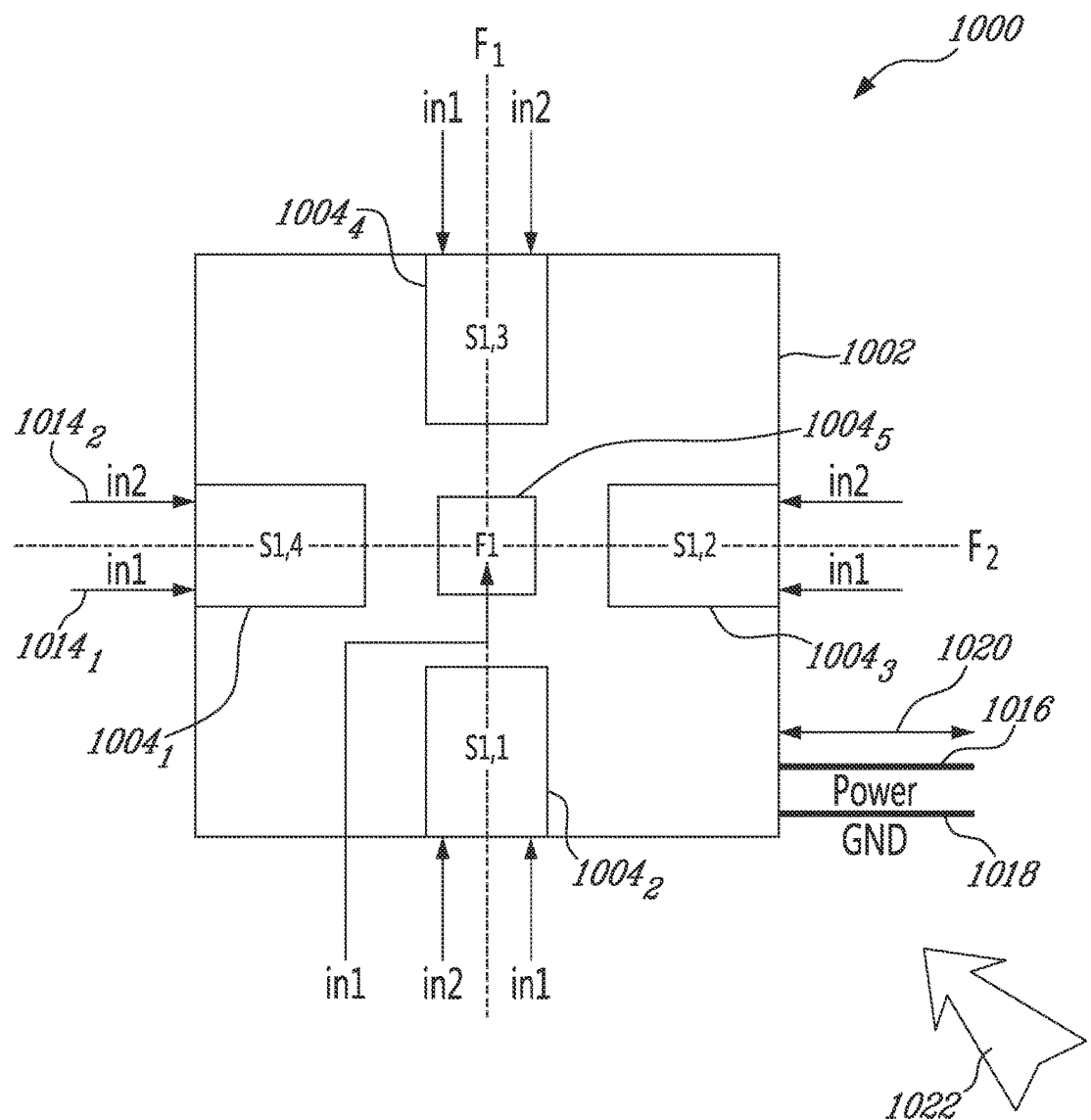
FIG. 9C is a detailed top view of the wind sensor module of FIG. 9B.

As shown in FIG. 9C, each sensor $1004_1$, $1004_2$, $1004_3$, $1004_4$ may be provided with a first input port $1014_1$ and a second input port $1014_2$ for wind entry, the sensor input ports used to measure a differential pressure between atmospheric pressure and dynamic pressure of the wind, the dynamic pressure being due to the wind's speed. The sensor $1004_5$ is illustratively only provided with one input port $1014_1$ for wind entry. The wind sensor module 1000 is further provided with a power connection 1016 as well as with a ground connection 1018. The wind sensor module 1000 further comprises a communication link 1020 to enable each sensor $1004_1$, $1004_2$, $1004_3$, $1004_4$ or $1004_5$ to communicate (using any suitable communication protocol) on demand to the controller (reference 624 in FIG. 8) the measured differential pressure upon entry of wind 1022. In particular, the sensors $1004_1$, $1004_2$, $1004_3$, $1004_4$, $1004_5$ are each configured to communicate the differential pressure measured at an inlet of their air intake 1006. The measured differential pressure can be positive or negative and measured at a predetermined time interval. In one embodiment, the sensors $1004_1$, $1004_2$, $1004_3$, $1004_4$, $1004_5$ are configured to simultaneously measure more than fifty (50) pressure readings per second. The controller 624 may then compare the received sensor data in order to determine the direction and speed of wind 1022. For this purpose, the sensors $1004_1$, $1004_2$, $1004_3$, $1004_4$, $1004_5$ may be pre-calibrated to establish a reference table of sensor readings and corresponding wind direction and speed.

Calibration may be done in a wind tunnel comprising a closed passage or chamber where the sensors $1004_1$, $1004_2$, $1004_3$, $1004_4$, $1004_5$ are rotatably mounted. Air having constant direction and variable and controlled flow is then moved past the sensors $1004_1$, $1004_2$, $1004_3$, $1004_4$, $1004_5$, which are rotated within the chamber. Constant reading of the sensor outputs enables to establish pressure response curves as a function of the wind's angle of incidence for each of the sensors $1004_1$, $1004_2$, $1004_3$, $1004_4$, $1004_5$. Due to the horizontal positioning of the air intakes 1006 of sensors $1004_1$, $1004_2$, $1004_3$, and $1004_4$, the pressure ratios of the sensors $1004_1$, $1004_2$, $1004_3$, and $1004_4$ illustratively remain constant regardless of the wind speed and only depend on the sensors' angular position relative to the wind's direction. In addition, the vertical positioning of the air intake 1006 of the sensor $1004_5$ causes the latter to be only sensitive to the speed of the wind (i.e. to the wind pressure) regardless of a direction of the wind. The response curves obtained for each sensor $1004_1$, $1004_2$, $1004_3$, $1004_4$, $1004_5$ during the calibration phase may then be stored (e.g. digitally) in memory (e.g. flash memory 828 in FIG. 8) along with the corresponding wind speed and direction using any suitable format, such as a reference table. The reference table may then be accessed by the controller 624 to compare the received sensor data to the reference table data. On the basis of the comparison, the controller 624 may determine the direction and speed of the wind that corresponds to the received sensor measurements.

It should be understood that, although the wind sensor module 1000 is illustrated as comprising five (5) sensors as in $1004_1$, $1004_2$, $1004_3$, $1004_4$, $1004_5$, more or less sensors may be used. For instance, satisfactory results may be obtained with three (3) sensors positioned along the plane of the printed circuit board 1002 so as to be separated by 120 degrees. This is because the pressure ratios of the sensors (e.g. sensors $1004_1$, $1004_2$, $1004_3$, and $1004_4$), which are positioned along the plane of the printed circuit board 1002 (e.g. horizontally) illustratively remain constant regardless of the wind speed and only depend on the sensors' angular position relative to the direction of the wind xxx. Still, the pressure values measured at each one of the sensors $1004_1$, $1004_2$, $1004_3$, $1004_4$, $1004_5$ depends on wind speed and increases for strong winds. The number of sensors to be used then depends on the desired measurement accuracy as well as on wind direction and speed.

The embodiments of the invention described above are intended to be exemplary only. The scope of the invention is therefore intended to be limited solely by the scope of the appended claims.

The invention claimed is:

1. A current generator for a wind turbine, the generator comprising:
 a substantially planar base member;
 a connection member secured to the base member at a geometrical center thereof, the connection member configured to rotate about a first axis transverse to a plane of the base member upon exertion of wind pressure on the wind turbine;
 a rotor assembly secured to the connection member for rotation about the first axis, the rotor assembly spaced apart from the base member and comprising a first substantially planar rotor member and a second substantially planar rotor member, the first rotor member spaced from the second rotor member and substantially parallel thereto; and
 a substantially planar stator assembly secured to the base member, the stator assembly comprising a stator disc implemented as a circular multilayer printed circuit board having a plurality of parallel and interconnected layers centered in a spacing between the first rotor member and the second rotor member, each layer comprising a plurality of identical stator cells equally distributed about the first axis and each extending radially away from the first axis along a second axis, the plurality of stator cells of a given layer aligned with the plurality of stator cells of an adjacent layer along the direction of the first axis and adapted to generate a current upon rotation of the first and second rotor members relative to the stator assembly, each stator cell comprising an electrical conductor wound around a plurality of concentric turns, the stator assembly further comprising a plurality of vias used to connect the plurality of layers and the plurality of aligned stator cells, each stator cell provided with a first via and a second via, the first via and the second via aligned along the second axis.

2. The current generator of claim 1, wherein the base member, the first rotor member, the second rotor member, and the stator assembly are circular and concentric about the geometrical center.

3. The current generator of claim 2, wherein each stator cell comprises the electrical conductor wound so as to form a trapezoidal shape and further wherein the rotor assembly comprises a first plurality of equidistantly spaced magnets arranged in a first circumferential array at a lower surface of the first rotor member and a second plurality of equidistantly spaced magnets arranged in a second circumferential array at an upper face of the second rotor member, the first plurality of magnets aligned with the second plurality of magnets along a direction parallel to the first axis, the current generated upon passage of the first and second plurality of magnets adjacent the plurality of stator cells.

4. The current generator of claim 3, wherein a first spacing between the first plurality of magnets is equal to a second spacing between the second plurality of magnets, a first width of the first plurality of magnets is equal to a second width of the second plurality of magnets, and the first spacing is equal to the first width and to a third width of an inner loop of each stator cell at a small base of the trapezoidal shape.

5. The current generator of claim 4, wherein the first plurality of magnets and the second plurality of magnets have alternating polarity and further wherein adjacent ones of the first plurality of magnets and of the second plurality of magnets have alternating polarity.

\* \* \* \* \*